US007331864B2

(12) United States Patent
Baerlocher

(10) Patent No.: US 7,331,864 B2
(45) Date of Patent: *Feb. 19, 2008

(54) GAMING DEVICE HAVING OFFER/ACCEPTANCE ADVANCE THRESHOLD AND LIMIT BONUS SCHEME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 450 days.

This patent is subject to a terminal disclaimer.

(21) Appl. No.: 10/925,561

(22) Filed: Aug. 25, 2004

(65) Prior Publication Data

US 2005/0020346 A1 Jan. 27, 2005

Related U.S. Application Data

(63) Continuation of application No. 09/838,014, filed on Apr. 19, 2001, now Pat. No. 6,890,257.

(51) Int. Cl.
*A63F 9/22* (2006.01)
*G06F 19/00* (2006.01)

(52) U.S. Cl. ........................ 463/20; 463/25; 273/143 R

(58) Field of Classification Search .................. 463/20, 463/27

See application file for complete search history.

(56) References Cited

U.S. PATENT DOCUMENTS 4,448,419 A 5/1984 Telnaes
4,582,324 A 4/1986 Koza et al.
4,624,459 A 11/1986 Kaufman
4,695,053 A 9/1987 Vazquez, Jr. et al.
4,991,848 A 2/1991 Greenwood et al.
5,178,390 A 1/1993 Okada
5,205,555 A 4/1993 Hamano (Continued)

FOREIGN PATENT DOCUMENTS

EP 0 874 337 A1 10/1998

(Continued)

OTHER PUBLICATIONS

Addams Family Advertisement and Article written by IGT, Strictly Slots, published in 2000.

(Continued)

*Primary Examiner*—John Hotaling
*Assistant Examiner*—Paul D'Agostino
(74) *Attorney, Agent, or Firm*—Bell Boyd & Lloyd LLP

(57) ABSTRACT

An offer acceptance game for a gaming or wagering device. One embodiment comprises: (i) an offer provided to a player; (ii) an input device by which the player accepts the offer; (ii) an input device by which the player rejects the offer; (iii) an advance threshold communicated to the player; and (iv) an advance provided to said player if the offer exceeds the advance threshold. The gaming device preferably includes at least one additional offer that is provided upon rejection of the first offer, wherein the game provides the advance if the final provided offer exceeds the advance threshold. The advance preferably includes second bonus game. The gaming device also preferably includes a limit communicated to said player, wherein the player does not obtain the advance if the second offer exceeds the limit.

92 Claims, 18 Drawing Sheets

U.S. PATENT DOCUMENTS

| | | | | |
|---|---|---|---|---|
| 5,342,047 | A | 8/1994 | Heidel et al. | |
| 5,456,465 | A | 10/1995 | Durham | |
| 5,524,888 | A | 6/1996 | Heidel | |
| 5,536,016 | A | 7/1996 | Thompson | |
| 5,542,669 | A | 8/1996 | Charron et al. | |
| 5,560,603 | A | 10/1996 | Seelig et al. | |
| 5,611,535 | A | 3/1997 | Tiberio | |
| 5,711,525 | A | 1/1998 | Breeding | |
| 5,769,716 | A | 6/1998 | Saffari et al. | |
| 5,772,509 | A | 6/1998 | Weiss | |
| 5,775,692 | A | 7/1998 | Watts et al. | |
| 5,788,573 | A | 8/1998 | Baerlocher et al. | |
| 5,823,874 | A | 10/1998 | Adams | |
| 5,833,538 | A | 11/1998 | Weiss | |
| 5,848,932 | A | 12/1998 | Adams | |
| 5,851,148 | A | 12/1998 | Brune et al. | |
| 5,873,781 | A | 2/1999 | Keane | |
| 5,882,261 | A | 3/1999 | Adams | |
| 5,902,184 | A | 5/1999 | Bennett et al. | |
| 5,911,418 | A | 6/1999 | Adams | |
| 5,947,820 | A | 9/1999 | Morro et al. | |
| 5,951,397 | A | 9/1999 | Dickinson | |
| 5,964,463 | A | 10/1999 | Moore, Jr. | |
| 5,967,894 | A | 10/1999 | Kinoshita et al. | |
| 5,980,384 | A | 11/1999 | Barrie | |
| 5,984,781 | A | 11/1999 | Sunaga | |
| 5,997,400 | A | 12/1999 | Seelig et al. | |
| 5,997,401 | A | 12/1999 | Crawford | |
| 6,001,016 | A * | 12/1999 | Walker et al. | 463/42 |
| 6,004,207 | A | 12/1999 | Wilson, Jr. et al. | |
| 6,010,404 | A * | 1/2000 | Walker et al. | 463/21 |
| 6,015,346 | A | 1/2000 | Bennett | |
| 6,019,369 | A | 2/2000 | Nakagawa et al. | |
| 6,033,307 | A | 3/2000 | Vancura | |
| 6,047,963 | A * | 4/2000 | Pierce et al. | 273/121 B |
| 6,056,642 | A | 5/2000 | Bennett | |
| 6,059,289 | A | 5/2000 | Vancura | |
| 6,059,658 | A | 5/2000 | Mangano et al. | |
| 6,062,980 | A | 5/2000 | Luciano | |
| 6,089,976 | A | 7/2000 | Schneider et al. | |
| 6,089,977 | A | 7/2000 | Bennett | |
| 6,089,978 | A | 7/2000 | Adams | |
| 6,093,102 | A | 7/2000 | Bennett | |
| 6,102,798 | A | 8/2000 | Bennett | |
| 6,120,031 | A | 9/2000 | Adams | |
| 6,126,541 | A | 10/2000 | Fuchs | |
| 6,126,542 | A | 10/2000 | Fier | |
| 6,139,013 | A * | 10/2000 | Pierce et al. | 463/20 |
| 6,142,873 | A | 11/2000 | Weiss et al. | |
| 6,142,874 | A | 11/2000 | Kodachi et al. | |
| 6,142,875 | A | 11/2000 | Kodachi et al. | |
| 6,146,273 | A | 11/2000 | Olsen | |
| 6,159,095 | A | 12/2000 | Frohm et al. | |
| 6,159,096 | A | 12/2000 | Yoseloff | |
| 6,159,097 | A | 12/2000 | Gura | |
| 6,159,098 | A | 12/2000 | Slomiany et al. | |
| 6,162,121 | A | 12/2000 | Morro et al. | |
| 6,168,520 | B1 | 1/2001 | Baerlocher et al. | |
| 6,168,523 | B1 | 1/2001 | Piechowiak et al. | |
| 6,173,955 | B1 | 1/2001 | Perrie et al. | |
| 6,174,233 | B1 | 1/2001 | Sunaga et al. | |
| 6,174,235 | B1 | 1/2001 | Walker et al. | |
| 6,190,254 | B1 | 2/2001 | Bennett | |
| 6,190,255 | B1 | 2/2001 | Thomas et al. | |
| 6,203,429 | B1 | 3/2001 | Demar et al. | |
| 6,210,279 | B1 | 4/2001 | Dickinson | |
| 6,213,876 | B1 | 4/2001 | Moore, Jr. | |
| 6,224,483 | B1 | 5/2001 | Mayeroff | |
| 6,231,442 | B1 | 5/2001 | Mayeroff | |
| 6,231,445 | B1 | 5/2001 | Acres | |
| 6,261,177 | B1 | 7/2001 | Bennett | |
| 6,302,790 | B1 | 10/2001 | Brossard | |
| 6,305,686 | B1 | 10/2001 | Perrie et al. | |
| 6,309,300 | B1 | 10/2001 | Glavich | |
| 6,328,649 | B1 | 12/2001 | Randall et al. | |
| 6,375,187 | B1 | 4/2002 | Baerlocher | |
| 6,494,785 | B1 * | 12/2002 | Gerrard et al. | 463/20 |
| 6,506,118 | B1 * | 1/2003 | Baerlocher et al. | 463/25 |
| 6,514,141 | B1 | 2/2003 | Kaminkow et al. | |
| 6,569,015 | B1 | 5/2003 | Baerlocher et al. | |
| 6,599,192 | B1 | 7/2003 | Baerlocher et al. | |
| 6,632,141 | B2 | 10/2003 | Webb et al. | |
| 6,648,754 | B2 | 11/2003 | Baerlocher et al. | |
| 6,692,355 | B2 | 2/2004 | Baerlocher et al. | |
| 6,722,981 | B2 | 4/2004 | Kaminkow et al. | |
| 6,722,982 | B2 | 4/2004 | Kaminkow et al. | |
| 6,758,750 | B2 | 7/2004 | Baerlocher et al. | |
| 6,786,820 | B2 | 9/2004 | Gerrard et al. | |
| 6,808,452 | B2 | 10/2004 | Baerlocher et al. | |
| 6,808,454 | B2 | 10/2004 | Gerrard et al. | |
| 6,811,483 | B1 | 11/2004 | Webb et al. | |
| 6,852,030 | B2 | 2/2005 | Baerlocher et al. | |
| 6,890,257 | B2 | 5/2005 | Baerlocher | |
| 6,899,623 | B2 | 5/2005 | Baerlocher | |
| 6,960,132 | B2 | 11/2005 | Baerlocher et al. | |
| 6,966,833 | B2 | 11/2005 | Kaminkow et al. | |
| 6,971,953 | B2 | 12/2005 | Gerrard et al. | |
| 2004/0038729 | A1 | 2/2004 | Webb et al. | |
| 2004/0185928 | A1 | 9/2004 | Baerlocher et al. | |
| 2005/0101375 | A1 | 5/2005 | Webb et al. | |
| 2005/0130729 | A1 | 6/2005 | Baerlocher et al. | |
| 2005/0187010 | A1 | 8/2005 | Baerlocher | |

FOREIGN PATENT DOCUMENTS

| | | | |
|---|---|---|---|
| EP | 0926645 | A2 | 6/1999 |
| EP | 0 944 030 | A2 | 9/1999 |
| EP | 0 945 837 | A2 | 9/1999 |
| EP | 0 981 119 | A2 | 2/2000 |
| EP | 0 984 409 | A2 | 3/2000 |
| EP | 0984408 | A2 | 3/2000 |
| WO | WO 9732285 | | 9/1997 |
| WO | WO 00/12186 | | 3/2000 |

OTHER PUBLICATIONS

Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Bonus Spin Red, White & Blue Advertisement, written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT undated.
Easy Street Advertisements and Articles written by Casino Data Systems, published in 2000.
Elvis Advertisement written by IGT, published in 1999.
Fire and Fortune Article written by Strictly Slots, published in 2001.
Fox "N" Hound Advertisement written by IGT, published in 2000.
In Between Game Description written by IGT, available prior to 2000.
Keep Your Hat On Advertisement written by Aristocrat, published in 2001.

Let's Make a Deal Game Advertisement written by Bally Gaming Systems, published in 1999.
Let's Make a Deal geocities.com (2 pages), printed on Mar. 16, 2001.
Let's Make a Deal written by fortunecity.com (4 pages), printed on Mar. 21, 2001.
Let's Make a Deal written by geocities.com (10 pages), printed on Mar. 21, 2001.
Let's Make a Deal written by Illinoislottery.com (1 page), printed on Mar. 21, 2001.
Little Green Men Brochure and Article, written by IGT/Strictly Slots published in 2000.
MegaJackpots Brochure, written by IGT, published in 1998.
Money Grab Article written by Strictly Slots, published on Apr. 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
Polly & Roger Advertisement written by VLC, Inc., published in 2000.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article and Brochure, written by Strictly Slots IGT/Anchor Games, published in 1999, 2001.
The Deals of Let's Make a Deal written by fortunecity.com (2 pages), printed on Mar. 16, 2001.
The Official Let's Make a Deal Website written by Bally Gaming System Website, printed on Mar. 16, 2001.
The Price is Right—Showcase Showdowns Description, printed from schuminweb.com (web site) on Mar. 16, 2001.
Top Cat Advertisement written by WMS Gaming, Inc., published prior to 2000.
Top Dollar Brochure, written by IGT, published in 1998.
Totem Pole Brochure, written by IGT, published in 1997.
Treasure Wheel/Treasure Tunnel Advertisement written by Sigma Game, Inc., published prior to 2000.
Wheel of Fortune Brochure, written by IGT, published in 1998.
Wheel of Fortune Brochure, written by IGT, published in 1999.
Wheel Poker Article, written by Strictly Slots (Anchor Games), published in Nov. 2000.
Winning Streak Web Site Description, printed from WMS Gaming Inc. (web site) on Mar. 21, 2001.
X Factor Advertisement and Website Page written by WMS Gaming, Inc., published in 1998.

* cited by examiner

GAMING DEVICE HAVING OFFER/ACCEPTANCE ADVANCE THRESHOLD AND LIMIT BONUS SCHEME

PRIORITY CLAIM

This application is a continuation of and claims the benefit of U.S. patent application Ser. No. 09/838,014, filed on Apr. 19, 2001, now U.S. Pat. No. 6,890,257 which is incorporated herein in its entirety.

CROSS REFERENCES TO RELATED APPLICATIONS

This application is related to the following commonly-owned co-pending patent applications: "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING A BONUS ROUND WITH MULTIPLE RANDOM AWARD GENERATION AND MULTIPLE RETURN/RISK SCENARIOS," Ser. No. 10/865,713, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING AN AWARD EXCHANGE BONUS ROUND AND METHOD FOR REVEALING AWARD EXCHANGE POSSIBILITIES:, Ser. No. 10/629,416, "GAMING DEVICE HAVING GRADUATING AWARD EXCHANGE SEQUENCE WITH A TEASE CONSOLATION SEQUENCE AND AN FIRST QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 10/288,750, "GAMING DEVICE HAVING A DESTINATION PURSUIT BONUS SCHEME WITH ADVANCED AND SETBACK CONDITIONS," Ser. No. 10/393,201, "GAMING DEVICE HAVING A DESTINATION PURSUIT BONUS SCHEME WITH ADVANCED AND SETBACK CONDITIONS," Ser. No. 10/660,075, "GAMING DEVICE HAVING VALUE SELECTION BONUS," Ser. No. 10/803,410, "GAMING DEVICE HAVING RISK EVALUATION BONUS ROUND," Ser. No. 10/616,563, "GAMING DEVICE HAVING AN IMPROVED OFFER/ACCEPTANCE BONUS SCHEME," Ser. No. 09/966,884, "GAMING DEVICE HAVING AN IMPROVED OFFER/ACCEPTANCE BONUS SCHEME," Ser. No. 10/245,387, "GAMING DEVICE HAVING IMPROVED OFFER AND ACCEPTANCE BONUS SCHEME," Ser. No. 10/074,273, "GAMING DEVICE HAVING IMPROVED AWARD OFFER BONUS SCHEME," Ser. No. 10/244,134, "GAMING DEVICE HAVING IMPROVED AWARD OFFER BONUS SCHEME," Ser. No. 10/318,752, "GAMING DEVICE HAVING IMPROVED AWARD OFFER BONUS SCHEME," Ser. No. 10/630,876, "GAMING DEVICE HAVING OFFER AND ACCEPTANCE GAME WITH HIDDEN OFFER," Ser. No. 10/160,688, "GAMING DEVICE HAVING OFFER ACCEPTANCE GAME WITH TERMINATION LIMIT," Ser. No. 10/678,656, "GAMING DEVICE HAVING IMPROVED OFFER AND ACCEPTANCE GAME WITH MASKED OFFERS," Ser. No. 10/086,014, "GAMING DEVICE HAVING AN OFFER AND ACCEPTANCE SELECTION BONUS SCHEME WITH A TERMINATOR AND AN ANTI-TERMINATOR," Ser. No. 10/644,447, "GAMING DEVICE HAVING MULTIPLE ROUND SCHEME WITH RESIDUAL AWARDS," Ser. No. 10/241,248, "GAMING DEVICE HAVING MULTIPLE ROUND SCHEME WITH RESIDUAL AWARDS," Ser. No. 10/810,146, "GAMING DEVICE HAVING AN OFFER AND ACCEPTANCE GAME WITH A PLAYER SELECTION FEATURE," Ser. No. 10/086,078, and "GAMING DEVICE HAVING IMPROVED OFFER AND ACCEPTANCE BONUS SCHEME," Ser. No. 10/074,273.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having an offer and acceptance bonus game with an advance threshold and limit.

BACKGROUND OF THE INVENTION

Gaming devices such as slot, poker, blackjack and keno machines having primary and secondary or bonus games are well known. One well known game provides a player with a series of award offers consisting of credits or dollars. The player may either accept each award offer or reject each award offer. The player must accept the final award offer. If the player accepts an award offer, the game provides the award offer to the player. If the player rejects the award offer, the gaming device provides second award offer to the player, as long as the current award offer is not the final award offer.

The award offers are randomly determined from a series of potential award offers of differing values. As illustrated in FIG. 3, the potential award offers 100 are displayed to the player. Each award offer provided by the game is displayed in a current offer display 102 or in second suitable manner. The number of offers remaining are displayed in an offers remaining display 104. Accept and reject buttons 106 and 108, respectively, enable the user to accept or reject the offers.

Several different variations of this type of game for a gaming device have been implemented in or proposed for gaming machines. For example, U.S. Pat. No. 6,142,873, which is assigned on its face to Casino Data Systems and which issued on Nov. 7, 2000, discloses an offer acceptance game that enables the player to increase offers until: (i) generating a predetermined total, whereby the player receives a jackpot; (ii) electing to retire and win the most recently increased offer; or (iii) exceed the predetermined total, whereby the player loses all accrued credits.

While the game of U.S. Pat. No. 6,142,873 provides an entertaining variation to the known offer acceptance game, the game limits the jackpot to exactly hitting the predetermined value. While such a game may suffice for a bonus round game wherein the jackpot is an award, the game does not suffice for other types of jackpots or advancements. Accordingly, there is a need for a new gaming device related to this type of offer and acceptance game.

SUMMARY OF THE INVENTION

The present invention provides an improved offer acceptance bonus game of a gaming or wagering device and method of operating the same. One embodiment of the present invention includes: (i) an advance threshold communicated to the player; (ii) a plurality of offers wherein at least one offer exceeds the advance threshold; (iii) an offer generator such as a wheel, reel, die or other mechanical device adapted to provide an offer to the player; and (iv) an advance provided to said player if the offer provided to the player exceeds the advance threshold.

One embodiment includes a second offer provided to the player upon an offer rejection, wherein the game provides the advance if the second offer exceeds the advance threshold. In second alternative embodiment, the gaming device provides a plurality of additional offers, wherein the game provides the advance if the final provided offer exceeds the advance threshold.

The advance is preferably an additional bonus game which yields an award or an additional bonus game that potentially yields an award. The advance may alternatively be an additional primary game or a plurality of primary or bonus games. Accordingly, the present invention additionally provides a layered or multiple bonus game wherein the player may obtain an advance in one bonus game to reach one or more additional bonus games or primary games.

The preferred embodiment of the present invention includes a limit, whereby the player forfeits the offer and the opportunity for the advance if the offer exceeds the limit. In one embodiment, the gaming device provides a consolation award to the player if the offer exceeds the limit. In a preferred embodiment, the gaming device provides a bonus award to the player if the offer equals the limit. In a preferred embodiment, the present invention provides an advance to the player if one of the offers meets or exceeds the advance threshold and is less then or equal to the limit.

It is therefore an advantage of the present invention to provide a gaming device which includes an improved offer and acceptance bonus game.

It is second advantage of the present invention to provide a gaming device which includes an offer and acceptance bonus game having an advance threshold, wherein the player obtains an advance if the player exceeds the advance threshold.

It is a further advantage of the present invention to provide a gaming device which includes an offer and acceptance game having an advance threshold and a limit, wherein the player obtains an advance if the player's offer is in the range between and including the advance threshold and the limit.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
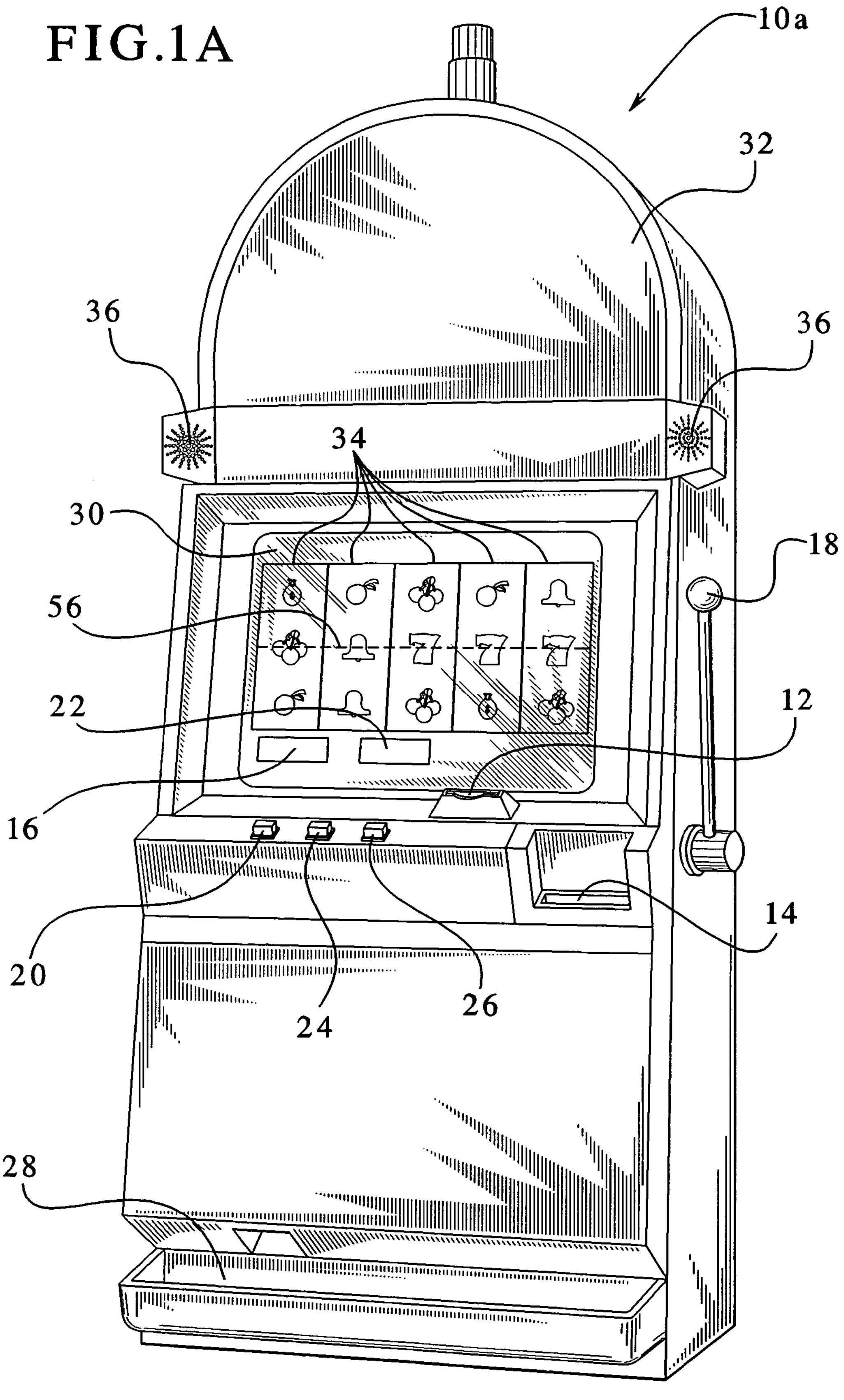
FIGS. 1A and 1B are perspective views of alternative embodiments of the gaming device of the present invention.
Figure 1B:
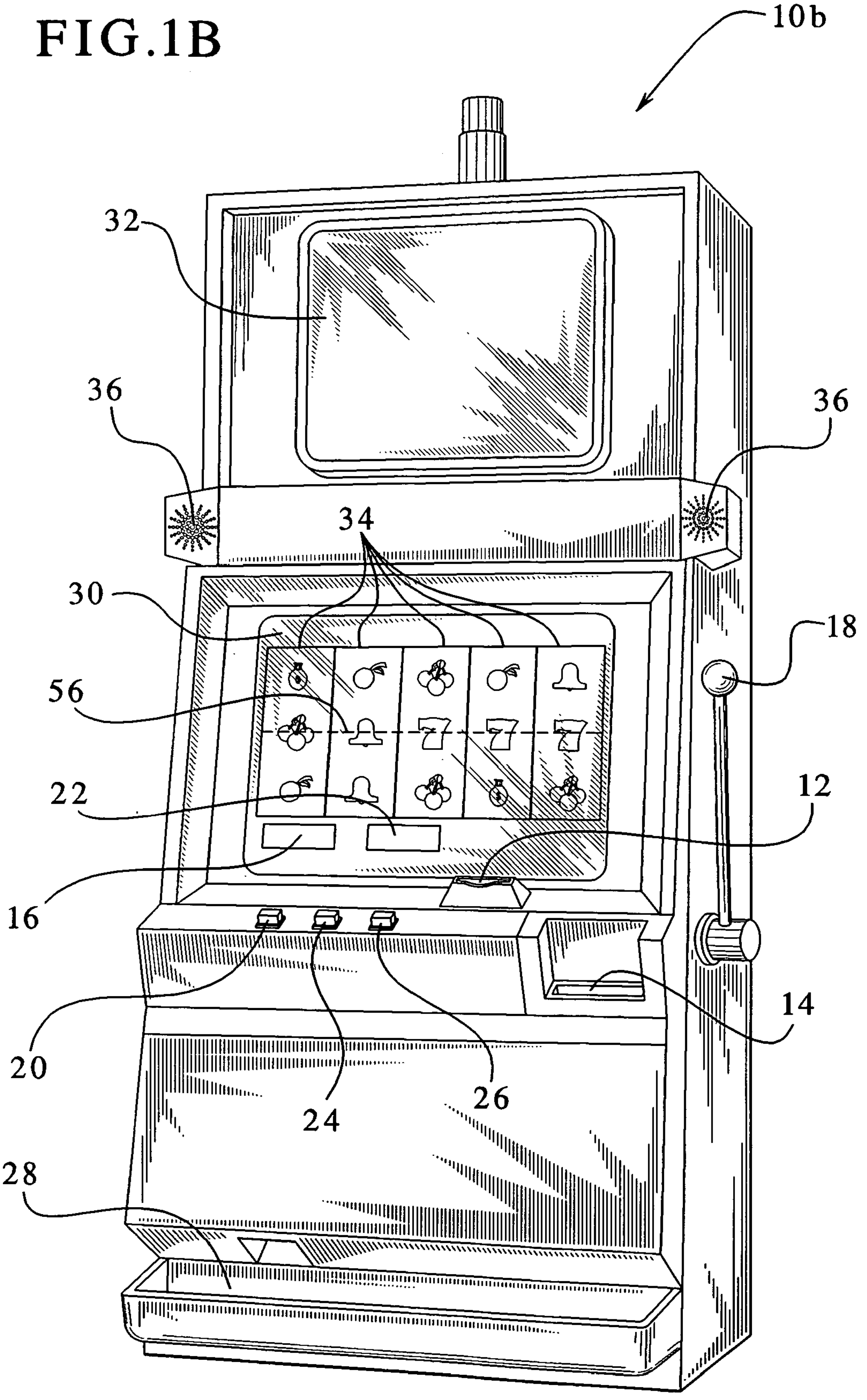

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. At any time during the game, a player may "cash out" by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
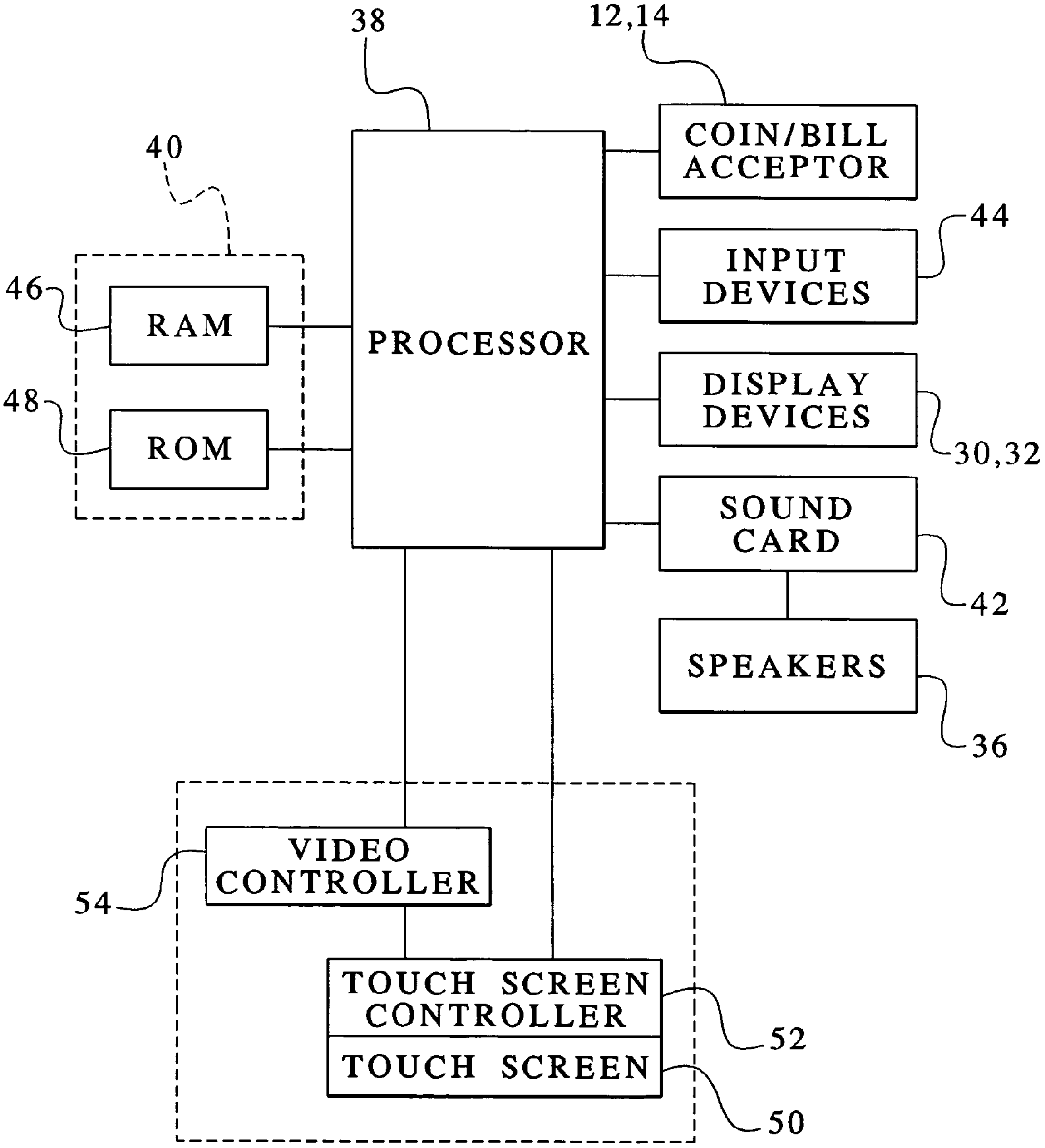
FIG. 2 is a schematic block diagram of the electronic configuration of one embodiment of the gaming device of the present invention.
Figure 3:
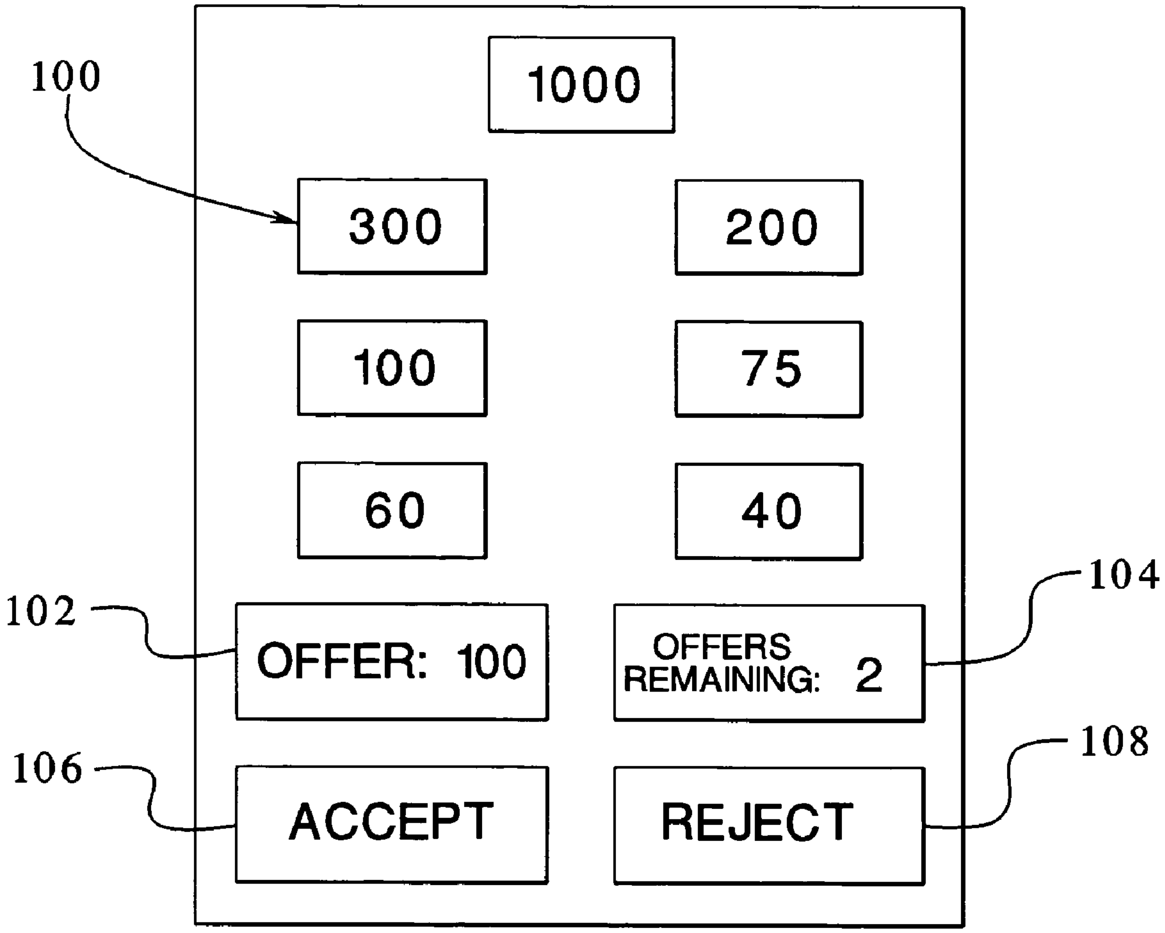
FIG.3 (PRIOR ART)
FIG. 3 is a front elevational view of a known offer and acceptance game.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on, e.g., three adjacent reels 34 along a payline 56. It should be appreciated that the present invention includes one or more paylines, such as payline 56, wherein the paylines can be horizontal, diagonal or any combination thereof. An alternative scatter pay qualifying condition includes the number seven appearing on, e.g., three adjacent reels 34 but not necessarily along a payline 56, appearing on any different set of reels 34 three times or appearing anywhere on the display device the necessary number of times.

Advance Threshold and Limit

Figure 4:
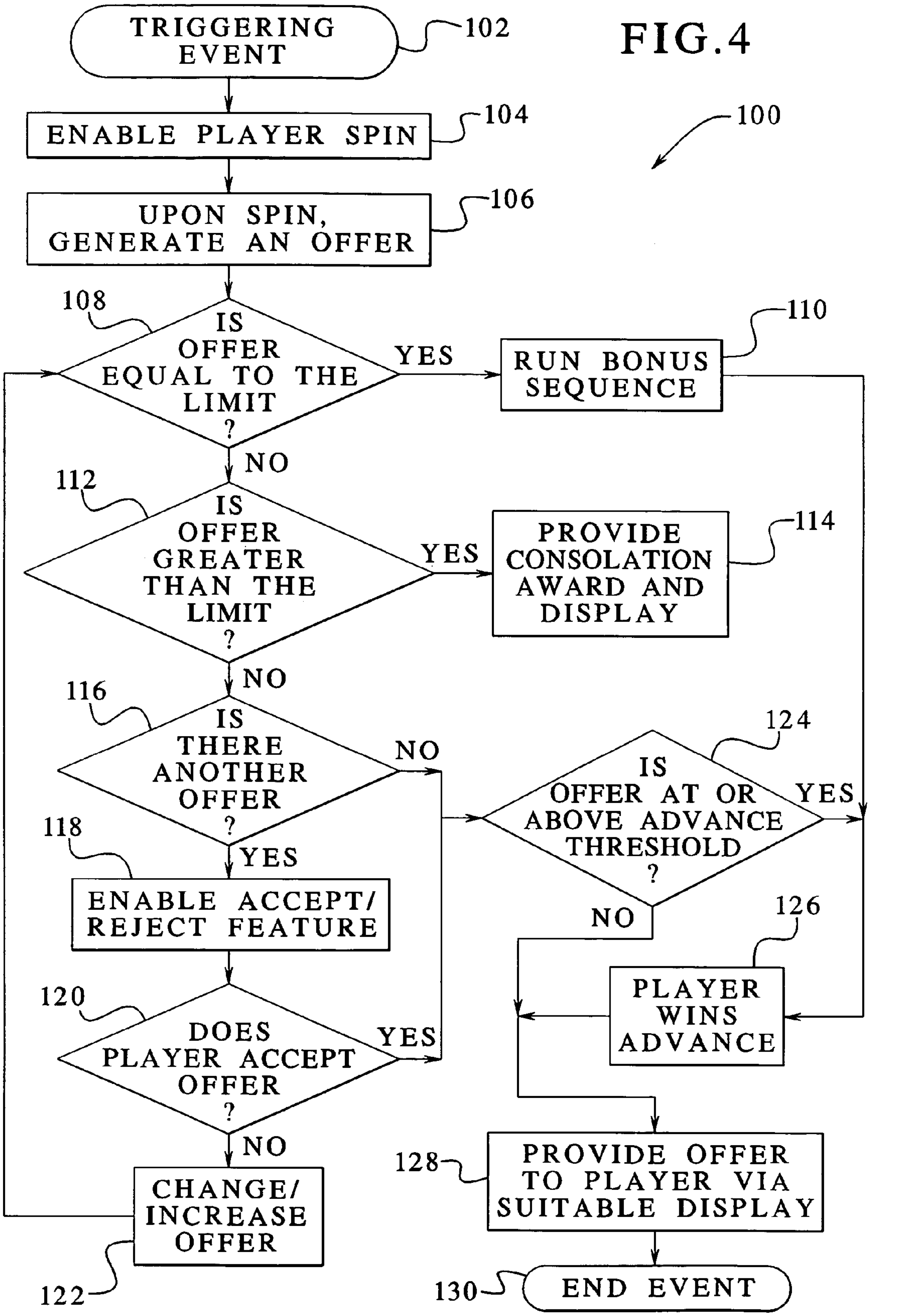
FIG. 4 is a schematic flow diagram of one method of operating the gaming device of the present invention.

One preferred embodiment of the method of the present invention is illustrated in FIG. 4 as method 100. Upon a sequence triggering event as indicated by oval 102, the game enables the player to start the game by inputting a spin command as indicated by block 104. One preferred embodiment of the present invention includes a simulated or electromechanical vertically rotatable wheel (not shown) attached to the gaming device, which has a plurality of offers. The wheel maybe any suitable wheel as known to one of ordinary skill in the art. Upon receipt of the spin command, the processor generates an offer, as indicated by block 106. The game determines if the offer equals a limit, as indicated by diamond 108. If the offer equals the limit, the game runs a secondary bonus sequence, as indicated by block 110. An embodiment of a bonus sequence is discussed in connection with FIG. 5.

If the offer does not equal the limit, the game determines if the offer is greater than the limit, as indicated by diamond 112. If the offer is greater than the limit, the game provides a consolation award and associated display, as indicated by block 114. It should be appreciated from this illustration that it is better for the player to come close to or equal the limit, than to exceed the limit. If the offer is less than the limit, the game determines if the player is able to receive second offer or opportunity, as indicated by diamond 116. As discussed below, one preferred embodiment provides two opportunities including an first offer or opportunity and one additional offer or opportunity. The game, however, may be adapted to provide any number of offers or opportunities.

If second offer is available, the game enables the accept/reject feature, as indicated by block 118. The game receives the player's accept offer input or the player's reject offer input, as indicated by diamond 120. If the player rejects the offer, the game provides a new offer, preferably increasing the offer as indicated by block 122, and repeats the process, beginning with whether the increased offer is equal to the limit, as indicated by diamond 108.

In the preferred rotatable wheel embodiment mentioned above, the player causes the wheel to spin a first time to obtain the first offer. The offer to the player is the number on the wheel designated in any suitable manner such as by an indicator or through lighting. The player causes the wheel to spin a second time to obtain the second offer. In an embodiment, the second offer to the player is the first offer plus the number designated by the wheel from the second spin. Alternatively, the second offer may simply be the number designated by the wheel after the second spin.

If another offer does not exist (see diamond 116) or the player accepts the offer (see diamond 120), the game determines if the current offer is at or exceeds an advance threshold, as indicated by diamond 124. In one embodiment the game advances the player if the player achieves the advance threshold. Alternatively, the game advances the player only when the player exceeds the advance threshold. If the player advances, the advance is adaptable to be any bonus game, primary game or gaming event that yields or potentially yields one or more awards or items of value. In one preferred embodiment, the advance is an additional or secondary bonus game wherein the player will win second bonus award or has an opportunity to win second bonus award. The present invention thus provides a layered bonus scheme where a player has an opportunity to advance from one bonus game to second bonus game by obtaining an advance in the first bonus game.

If the current offer does not meet or exceed the advance threshold, the game provides or awards the current offer to the player via a suitable display, as indicated by block 128, and ends the main sequence, as indicated by oval 130. If the current offer meets or exceeds the advance threshold, the game: (i) enables or issues an advance to the player as indicated by block 126; (ii) provides or awards the current offer to the player via a suitable display, as indicated by block 128; and (iii) ends the main sequence, as indicated by oval 130. It should be appreciated from FIG. 4 that if the player's offer equals the limit, the game runs the secondary bonus sequence as indicated by block 110, and also provides or awards the advance to the player, as indicated by block 126.

Although not illustrated, an embodiment of the present invention includes an auto-accept feature. Here, after generating an award as indicated by block 106, or increasing the offer as indicated by block 122, the game automatically accepts the offer if it meets or exceeds the advance threshold. That is, the game in this embodiment does not permit the player to risk an advance by rejecting an offer once the advance threshold is met. If the offer does not meet or exceed the advance threshold, the game of this embodiment otherwise operates as illustrated.

Figure 5:
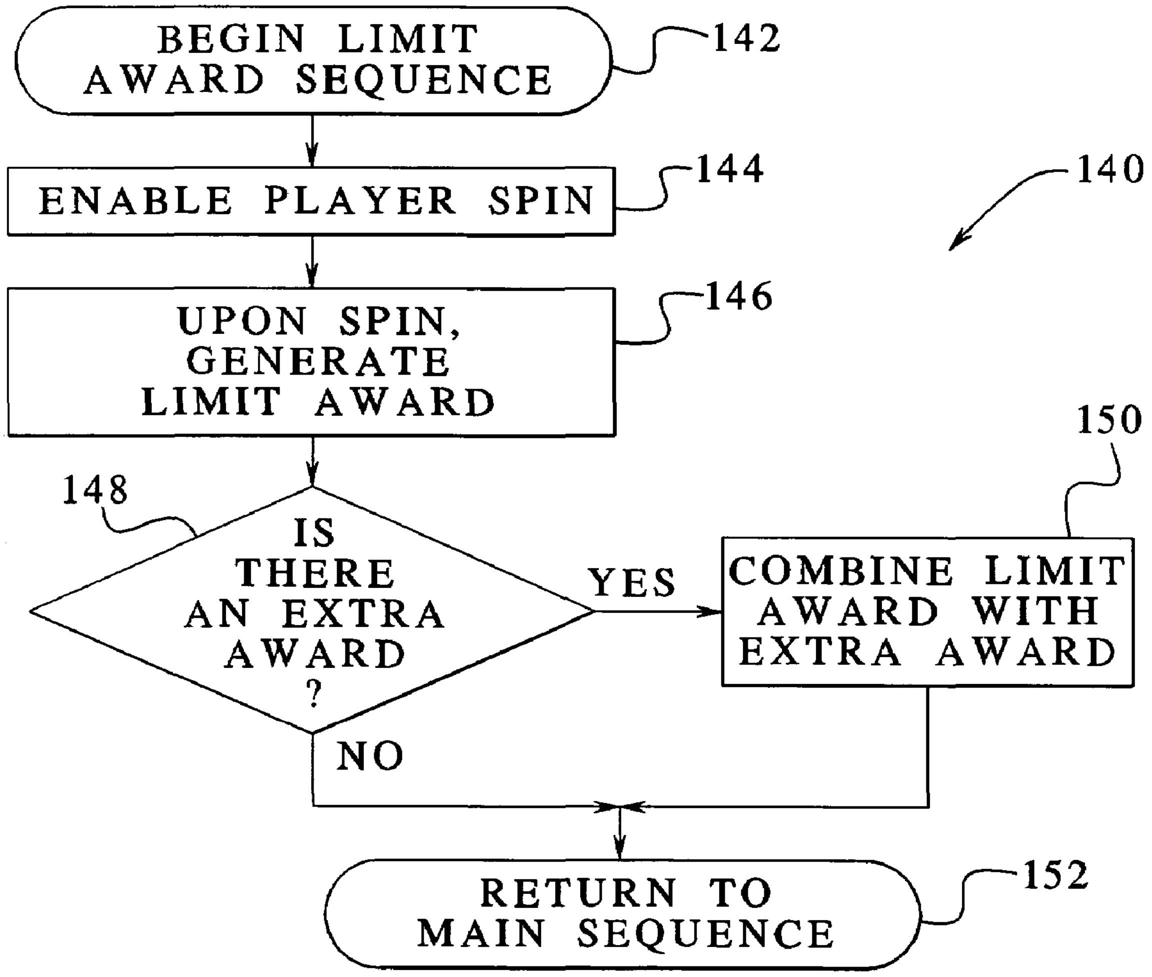
FIG. 5 is a schematic flow diagram illustrating a secondary bonus sequence of the gaming device of the present invention.

Referring now to FIG. 5, one preferred limit award sequence 140 of the present invention is illustrated. As stated above in connection with the method 100, if the player's offer at any time equals the limit, the game provides a limit award, through a limit award sequence, as indicated by oval 142. The game enables the player to selectively start the limit award sequence 140, as indicated by block 144. In one preferred embodiment, the limit award sequence enables the player to enter second spin command and receive a limit award, as indicated by block 146. The limit award sequence 140 may increase the firstly generated limit award by providing an extra award, as indicated by diamond 148 and block 150, in certain instances if the player's spin results in a predetermined condition. In an embodiment, the game adds the limit award to the extra award. One limit award sequence 140 and one condition for increasing the extra award are discussed below in connection with FIGS. 7F through 7H. In one embodiment, the limit awards range from and including zero awards to an amount of awards equal to the limit. Upon the generation of a predetermined condition, the game generates the extra award, which in combination with the limit award, can exceed the limit amount. The limit award sequence ultimately returns the player to the main sequence 100, as indicated by oval 152.

Figure 6:
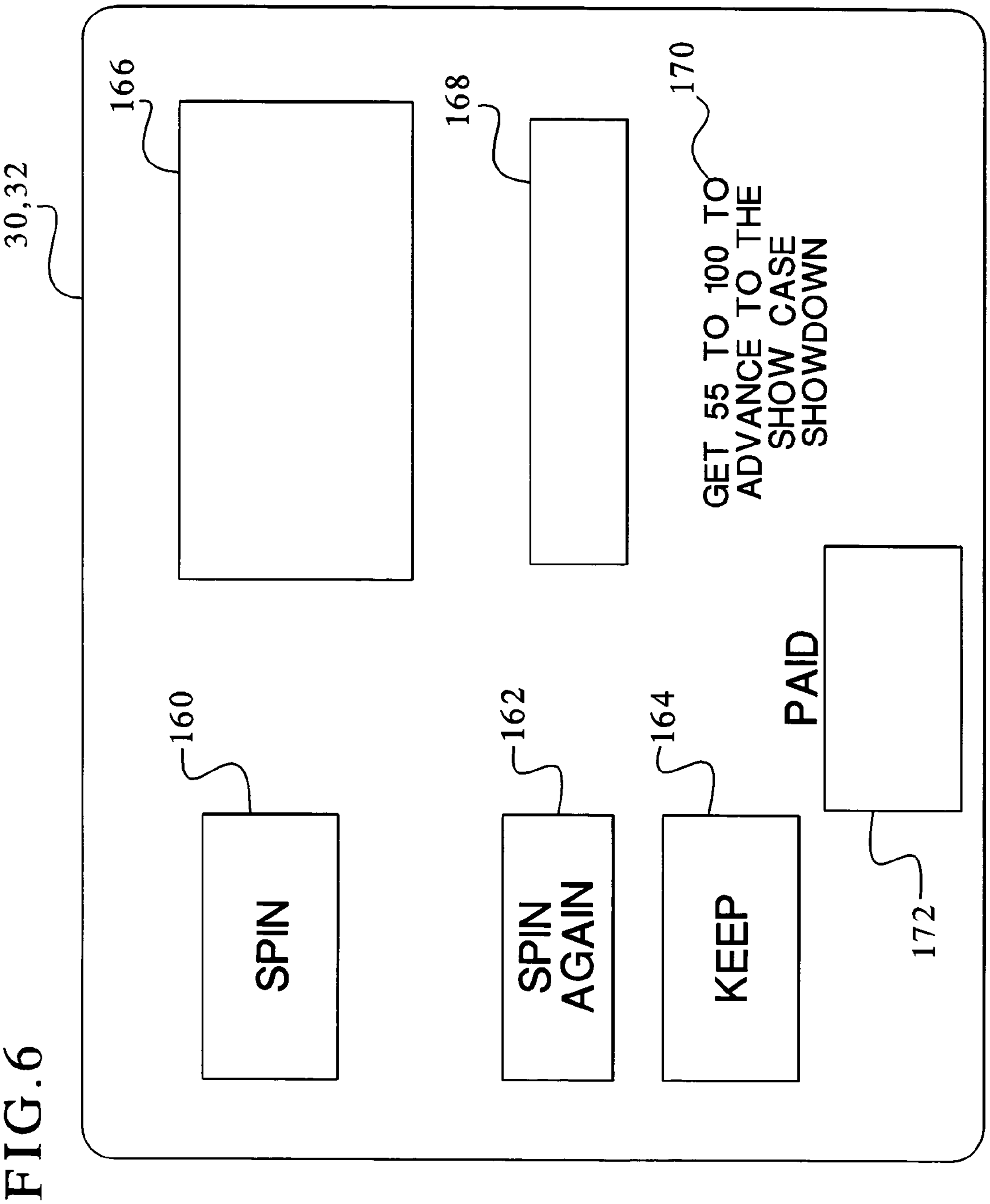
FIG. 6 is a front elevational view of one of the display devices of FIGS. 1A and 1B generally illustrating one preferred embodiment, wherein the game includes an offer acceptance game having a limit and an advance threshold.

Referring now to FIG. 6, one embodiment of the present invention employs one or both display devices 30 and/or 32 (FIGS. 1A and 1B), a spin or generate outcome input 160, a reject offer or spin again input 162 and an accept offer or keep offer input 164. The inputs 160, 162 and 164 may be separate areas of a touch screen 50, or alternatively, the inputs are separate electromechanical input devices. In one embodiment, the generate outcome input 160 is a vertically rotatable wheel or reel as indicated above. For purposes of illustration, the remaining drawings illustrate active inputs in bold and non-active inputs in phantom.

The present invention may include one or more audio, visual or audiovisual message displays 166 that inform the player as to the player's game status after an first spin or an offer reject, i.e., spin again. For purposes of illustration, the status messages are hereafter visually displayed, however, they include being audio messages or visual messages that are audibly enhanced. In one embodiment, the present invention includes an offer display 168 that displays the player's most recent offer after an first or additional spin. The offer display 168 is also adaptable to have accompanying audio messages.

In one embodiment, the present invention further includes an audio, visual or audiovisual message display 170, which informs the player of the advance threshold. In one implementation, the game sets the limit to one hundred. The game also sets the advance threshold to fifty-five, such that if the player achieves an offer of fifty-five to one hundred, the player wins an advance. The game alternatively requires the player to achieve an offer that exceeds the advance threshold to advance. The range created by the advance threshold and limit is the advance range. If the player exceeds the limit of one hundred, the player loses and preferably receives a consolation award. It should be appreciated that the present invention includes using different advance ranges at different times in a game or in different games. The different advance ranges have different limits, different advance thresholds and/or set the advance threshold to a higher or lesser percentage of the limit.

In one embodiment, the display includes a simulated paid display 172 that displays an amount of credits that a particular game of the present invention has actually paid to the player. In addition to game credits, the awards provided by the present invention are adaptable to be game credit modifiers such as a multiplier, which multiplies a number of game credits. The game credit numbers include a number of credits bet on one or more paylines 56, credits from one or more payline 56 wins or a player's total credits. The awards of the present invention also include any other suitable award such as a number of picks from a prize pool.

Referring now to FIGS. 7A through 7F, one example of the present invention illustrates different scenarios which may occur when the player spins and the game does not provide an offer that meets or exceeds the advance threshold. The player 174 firstly touches the spin input device 160, and the game generates an offer of forty-five for the player, as indicated in the offer display 168. The game preferably maintains one or more well known databases and/or one or more well known random number generators to generate values or offers for the player. In one embodiment, the game includes generating any multiple of five from five to one hundred, including one hundred.

The game is adapted to generate any desired offer range. In an embodiment wherein the game replaces offers rather than adds offers, the game includes a range having values greater than the limit which terminates the game. The game is also adaptable to generate any desired offer multiple, such as a multiple of one, two, five, etc. The game may or may not be adapted to be able to generate the same offer two or more times. The game is further adaptable to weigh the offers such that one offer is selected more often on average than at least one other offer.

The message display 166, as illustrated, informs the player of the result of the first spin. In this example, the game informs the player that the player needs a higher offer to win an advance. The message display 166 also informs the player that the player is able to keep or accept the current offer of forty-five or risk the offer for a chance to win an advance. As illustrated by the paid display 172, the game has not paid any credits to the player.

Figure 7A:
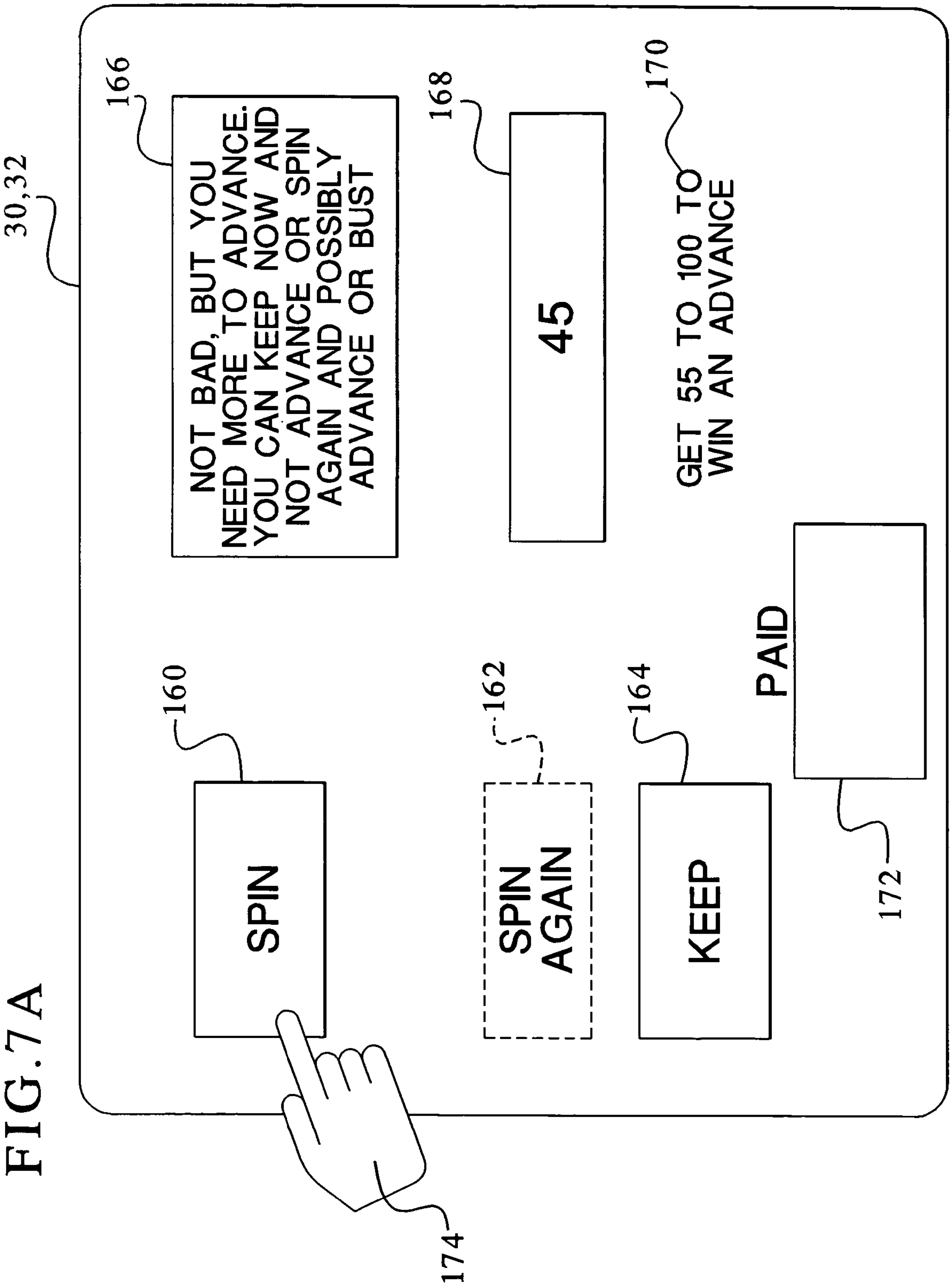
FIGS. 7A through 7H are front elevational views of one of the display devices of FIGS. 1A and 1B illustrating example outcomes of when an first offer does not meet or exceed the advance threshold.
Figure 7B:
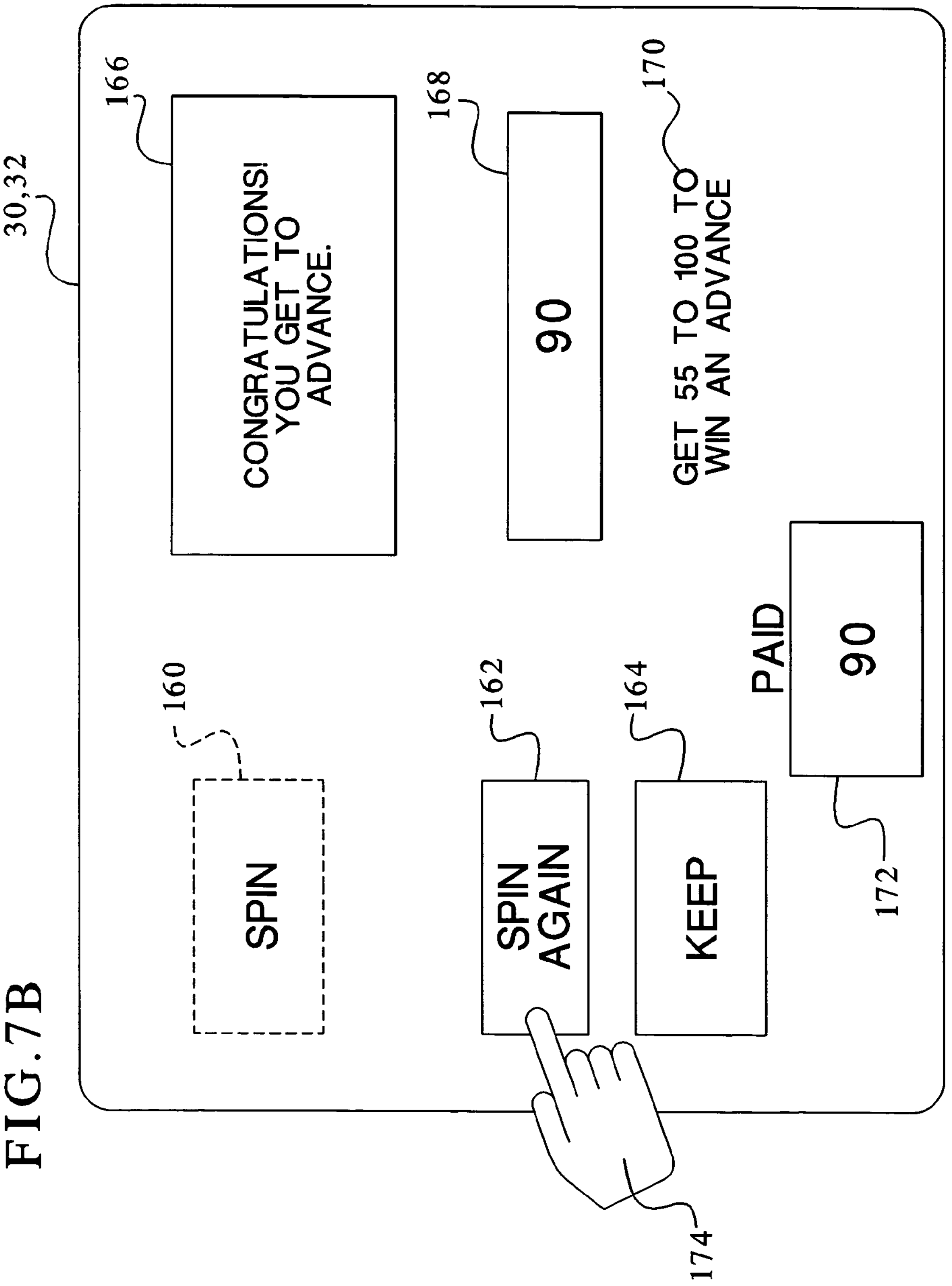

FIG. 7B illustrates one second spin outcome. In an embodiment, after the first spin, the game does not enable the player to re-pick the spin input 160, which is now shown in phantom. The game instead enables the player to pick spin again input 162 or the accept input 164, which are now shown with solid lines. In this example, the player risks the previously generated forty-five offer and picks the reject offer or spin again input 162, whereby the game increases the player's offer to ninety, as indicated by the offer display 168.

In one preferred embodiment, the game thereafter no longer enables the player to spin again or reject an offer and pays the increased offer of ninety to the player, as indicated by the paid display 172. Other embodiments may be adapted to provide any set number or an unlimited number of spins. The message display 166 informs the player of the status after the second spin. In this example, the game informs the player that the player has achieved a sufficient offer to win an advance.

Figure 7C:
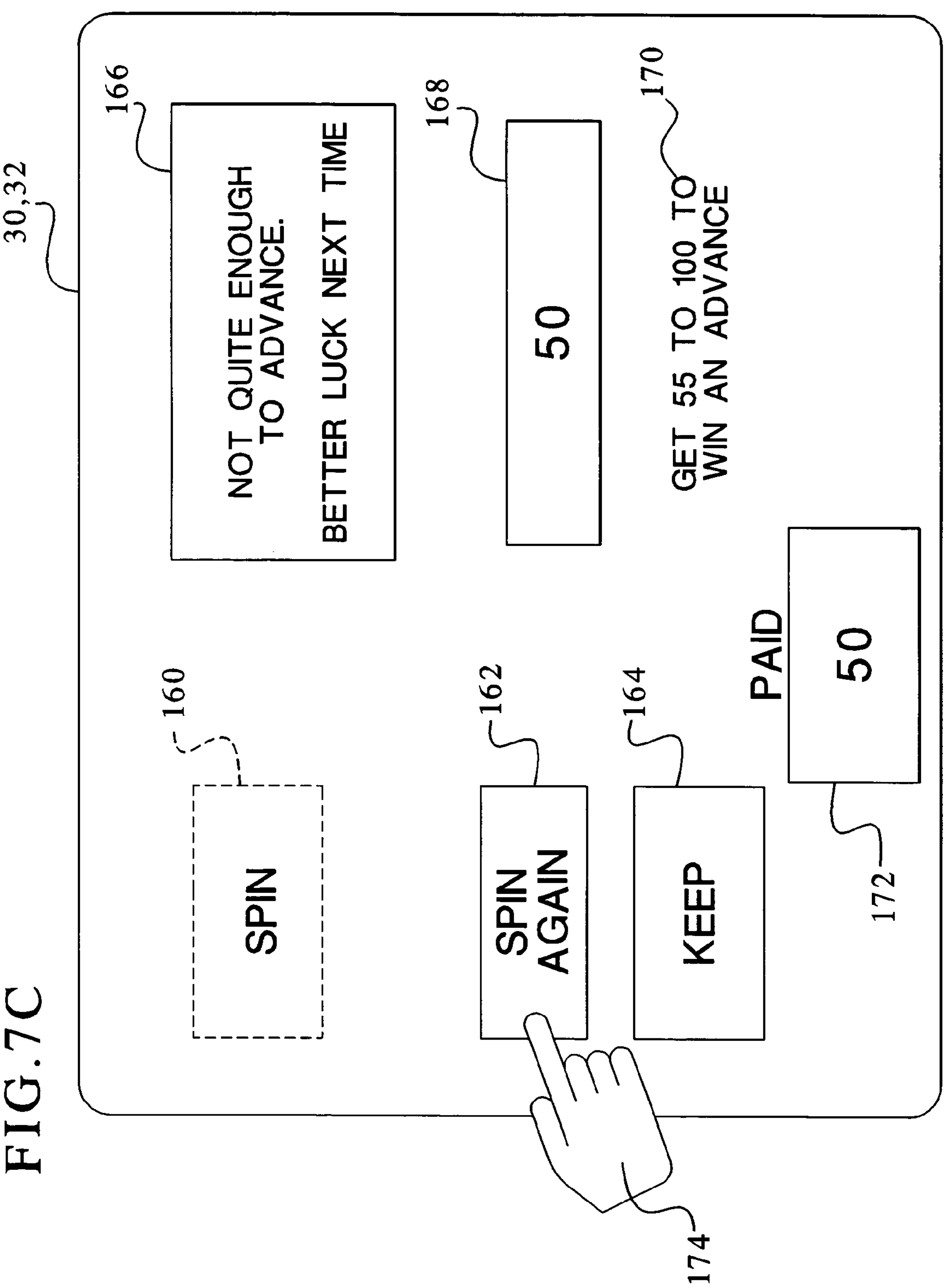

FIG. 7C illustrates second example second spin outcome. After the first spin, the game enables the player to accept the offer or spin again. In this example, the player risks the previously generated forty-five offer and touches spin again input 162. The game only increases the player's offer to fifty, as indicated by the offer display 168.

In the embodiment where the player has two opportunities or spins, the game thereafter no longer enables the player to spin again and pays the increased offer of fifty to the player, as indicated by the paid display 172. The message display 166 informs the player of the status after the second spin. In this example, the game informs the player that the player has not achieved a sufficient offer to win an advance.

Figure 7D:
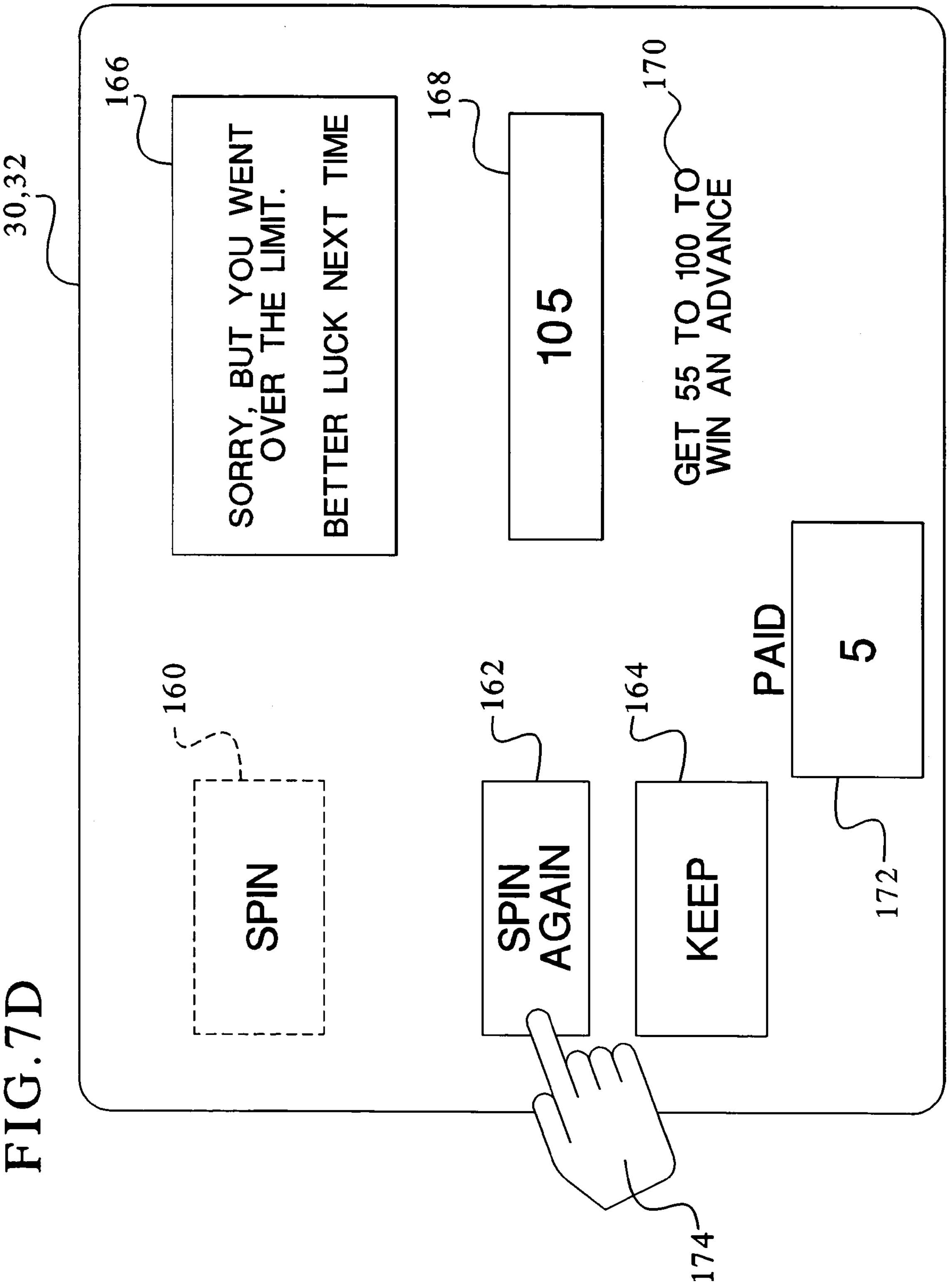

FIG. 7D illustrates a further example second spin outcome. After the first spin, the game enables the player to accept the offer or spin again. In this example, the player risks the previously generated forty-five offer and picks the spin again input 162. The game increases the player's offer to one hundred and five, as indicated by the offer display 168.

Since the limit is one hundred in this example, if the game generates or increases an offer greater than the limit of one hundred, the player loses the previous offer. In one embodiment, the game provides nothing to the player. In second embodiment, the game provides a consolation award to the player. In this example, the game provides a consolation award of five, as indicated by the paid display 172. The message display 166 informs the player of the status after the second spin. In this example, the game informs the player that the player has achieved an offer that has surpassed the limit.

In an embodiment, the game provides the same consolation award each time the player achieves an offer that exceeds the limit. Alternatively, the game provides different consolation values in different games. The game may be adapted to randomly generate a consolation value from a plurality of consolation values to select a consolation value from a predetermined distribution. In one embodiment, the game provides higher consolation values for higher offers risked. In second embodiment, the consolation prize is related to the amount by which the offer exceeds the limit.

FIGS. 7B through 7D each illustrate that the game preferably increases the previously generated offer when the player spins again. The present invention also includes an embodiment having an offer distribution with one or more zero or negative values, so that a subsequent offer can be less than the previous.

Figure 7E:
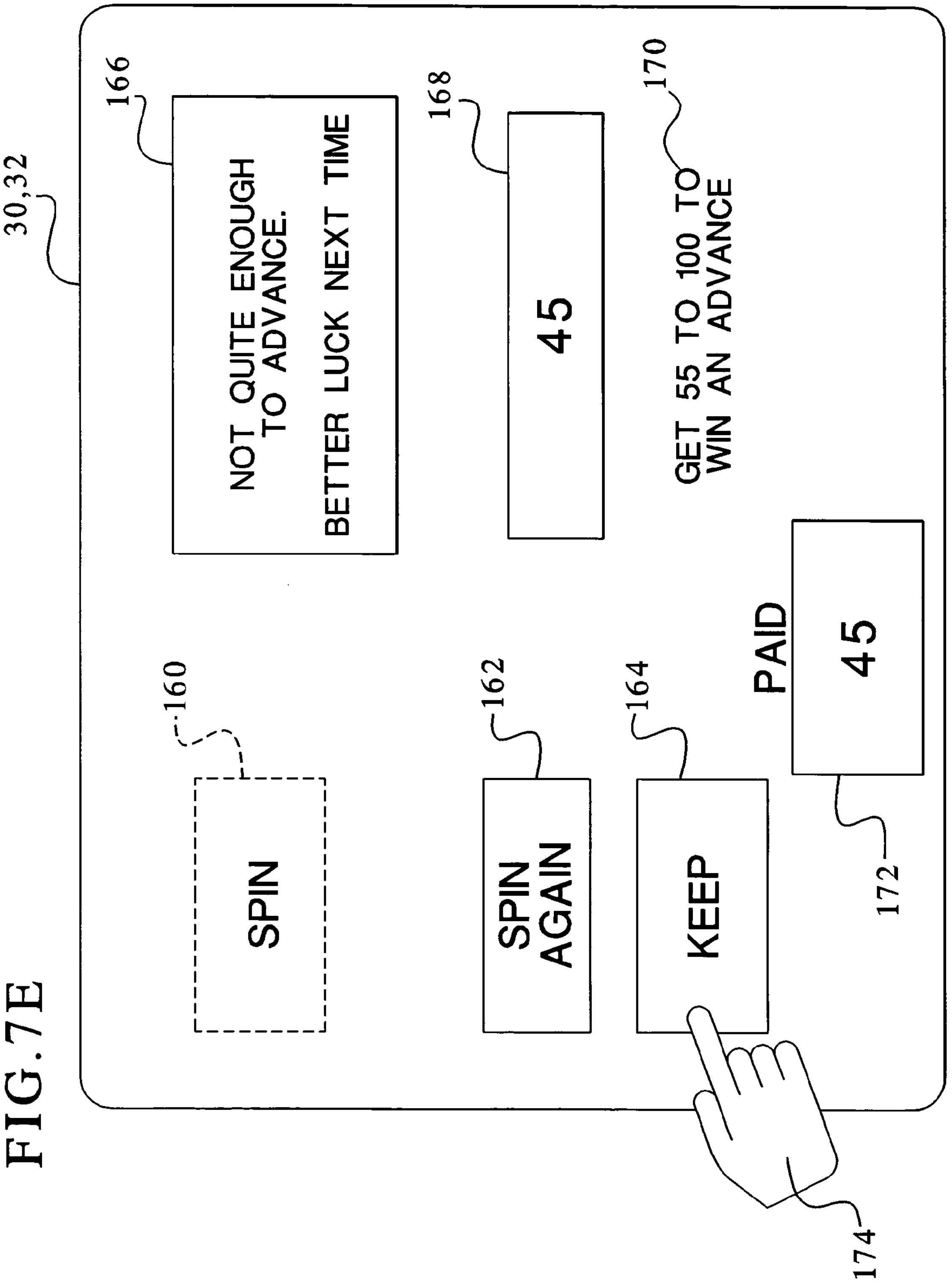

FIG. 7E illustrates second example post-first spin outcome. After the first spin, the game enables the player to accept the offer or spin again. As illustrated, the player does not risk the previously generated forty-five offer and picks the accept offer or keep input 164. The game does not modify the player's offer, as indicated by the offer display 168. The game pays the accepted offer of forty-five to the player, as indicated by the paid display 172. The message display 166 informs the player of the current status. In this example, the game informs the player that the player has not achieved a sufficient offer to win an advance.

Figure 7F:
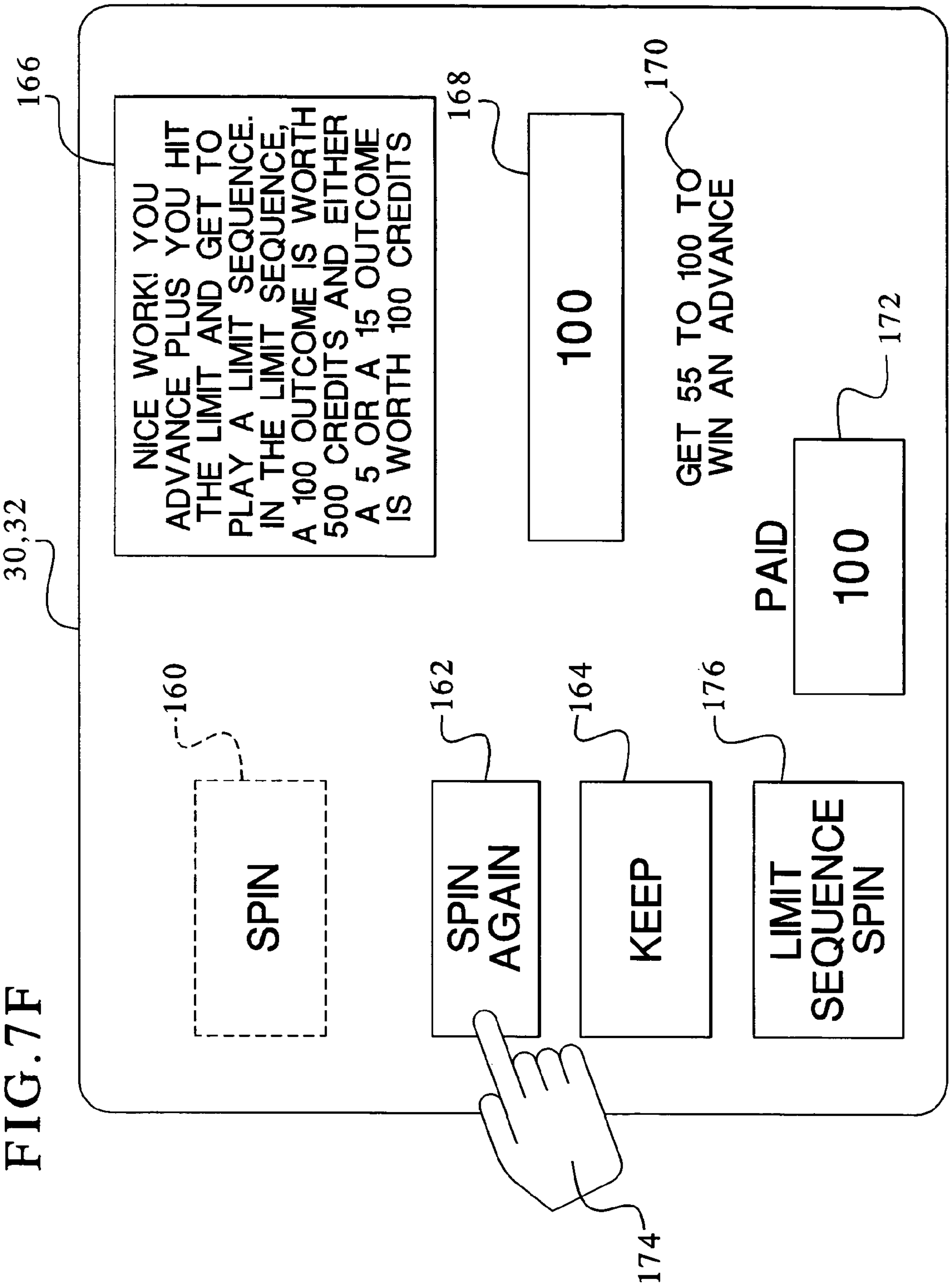

FIG. 7F illustrates a further example second spin outcome. After the first spin, the game enables the player to accept the offer or spin again. In this example, the player 174 risks the previously generated forty-five offer and picks the spin again input 162. The game increases the player's offer to one hundred, which is the limit. The game then invokes a secondary bonus sequence, as indicated by block 110 of FIG. 4. The message display 166 informs the player that the player has won an advance and enables the player to play the secondary bonus sequence. The game also pays the one hundred credits to the player, as indicated by the paid display 172.

The message 166 in FIG. 7F sets forth one preferred embodiment for the limit award sequence of the present invention. In this limit award sequence, the game provides a single spin and generates a limit award based on the outcome of the single spin. The message 166 in FIG. 7F also indicates that the game provides an extra award, which is combined with the limit award, if one or more particular conditions are met. It should be appreciated that more than one limit sequence spin can be provided to the player and that other suitable limit award sequences and limit awards may be provided to the player. In this example, if the player's limit sequence spin results in a limit award of five or fifteen, an extra award is added to the limit award to create a total of 100. If the spin is one hundred, the extra award is added to create a total award of 500. The limit awards and extra awards can alternately be multiplied together.

The limit award sequence may be alternatively adapted and have other conditions for producing the extra award as well as other suitable extra awards. For instance, the limit award sequence can be the replay of the entire primary bonus sequence 100 (FIG. 4), whereby the condition for the extra award is achieving or exceeding the advance threshold. The limit award sequence may also be adapted to include a separate simulated or mechanical prize wheel or reel, which generates a number of game credits or other items of value.

FIG. 7F also illustrates that upon triggering the secondary bonus sequence, the game provides an limit sequence spin input 176, which is preferably a simulated area of a touch screen 50 (FIG. 2). The game alternatively includes suitably audibly or visually informing the player to make a limit sequence spin via the spin again input 162 or from some other desired selection area.

Figure 7G:
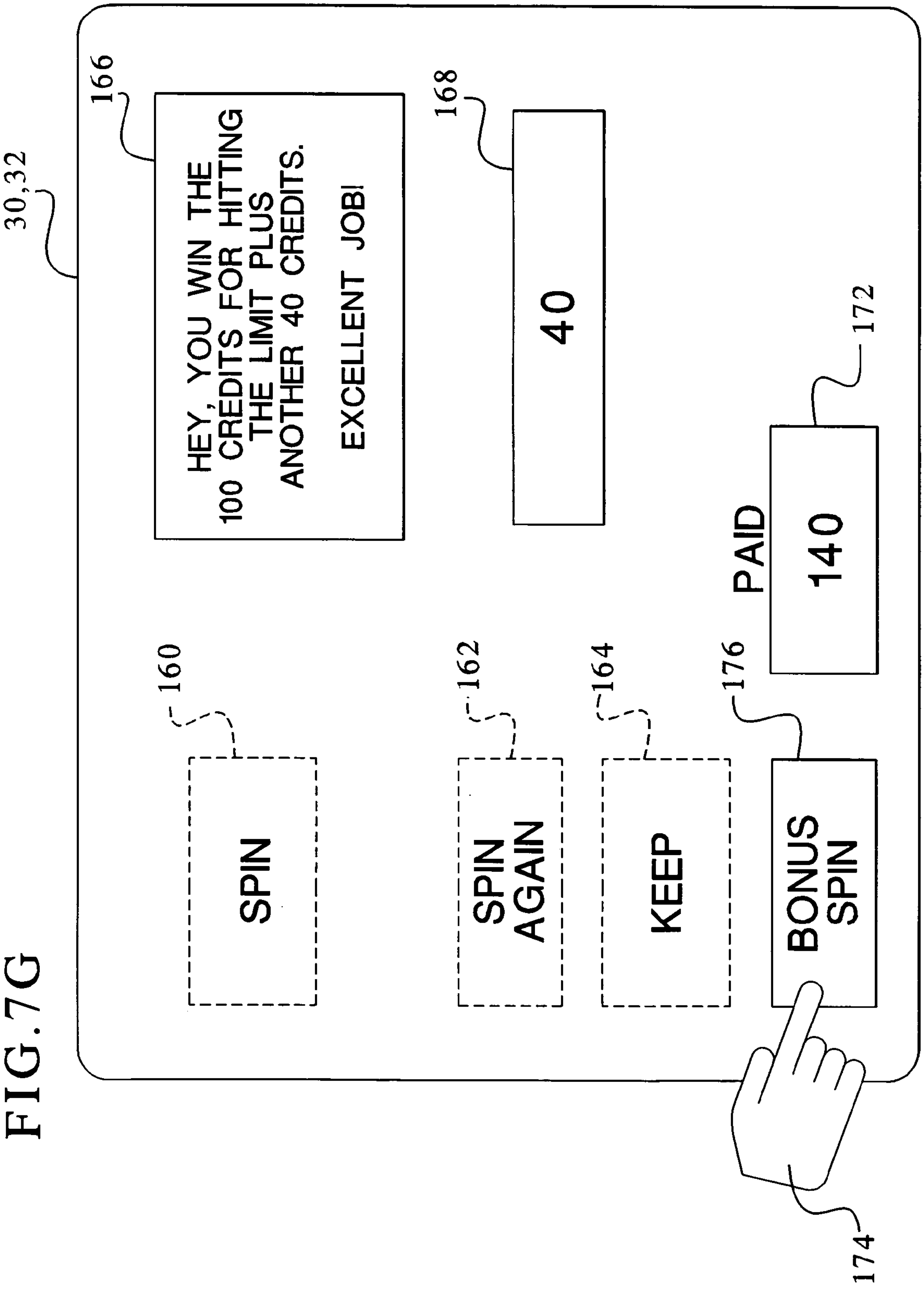

FIG. 7G illustrates an example of the limit award outcome. When the player achieves the limit, the game initiates the limit sequence by displaying and providing the bonus spin input 176. The game also disables the spin again and keep input devices, as illustrated in phantom. As illustrated, the player picks the bonus spin input 176. The game generates the limit award of forty as indicated by the offer display 168. The message 166 indicates that the player wins one hundred awards for achieving the limit plus the limit award of forty. The paid display illustrates that the game pays a total award of 140 to the player.

Figure 7H:
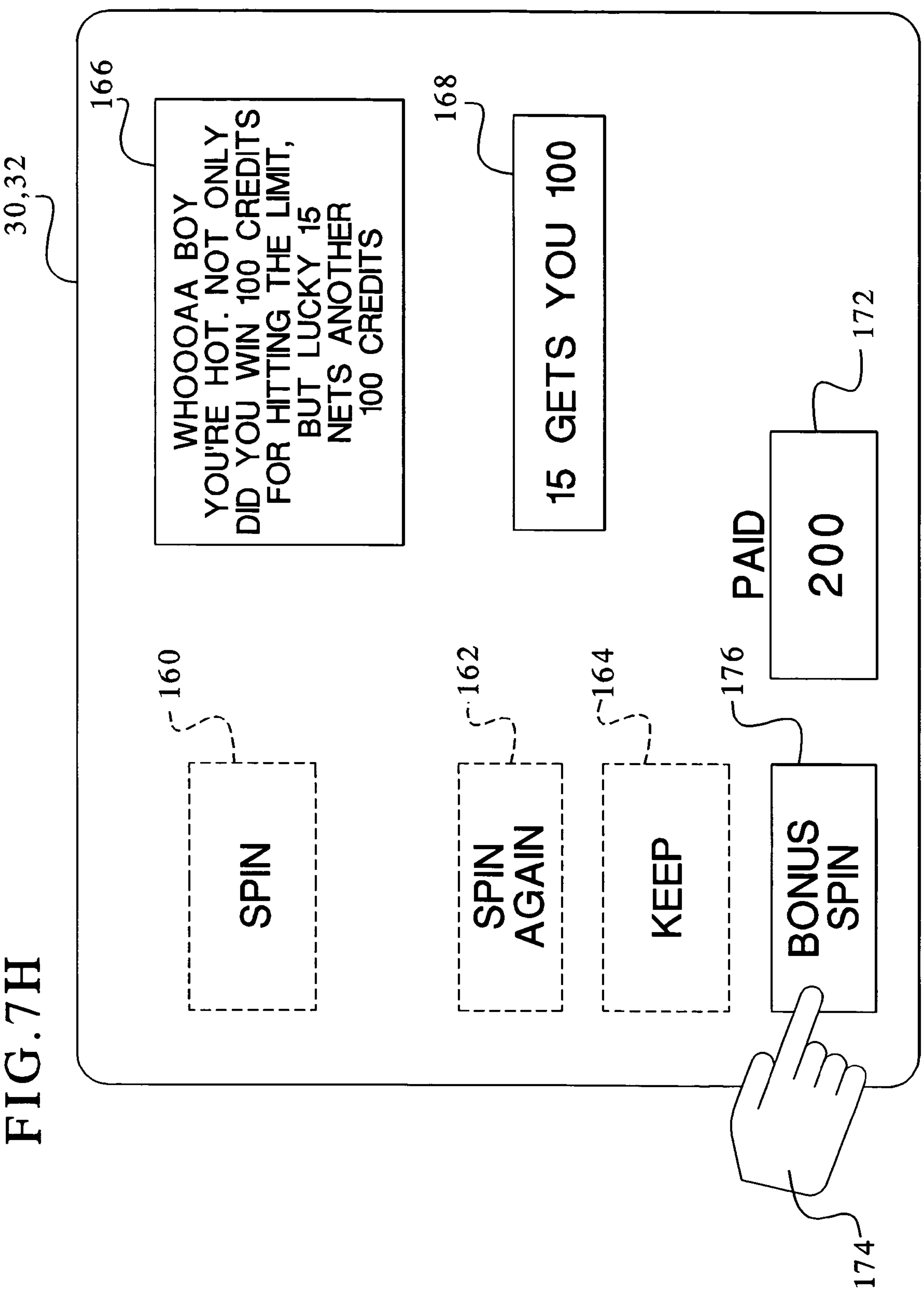

FIG. 7H illustrates second example limit award outcome. When the player achieves the limit, the game enables the limit award by displaying and providing the bonus spin input 176. As illustrated, the player picks the bonus spin input 176. The game generates the limit award of fifteen, which meets the predetermined condition so that the limit award is combined with an extra award to create a total award of one hundred, as indicated by the offer display 168. The message 166 indicates that the player wins one hundred awards for achieving the limit plus an additional award of one hundred. The paid display illustrates that the game pays a total award of 200 to the player.

Figure 8A:
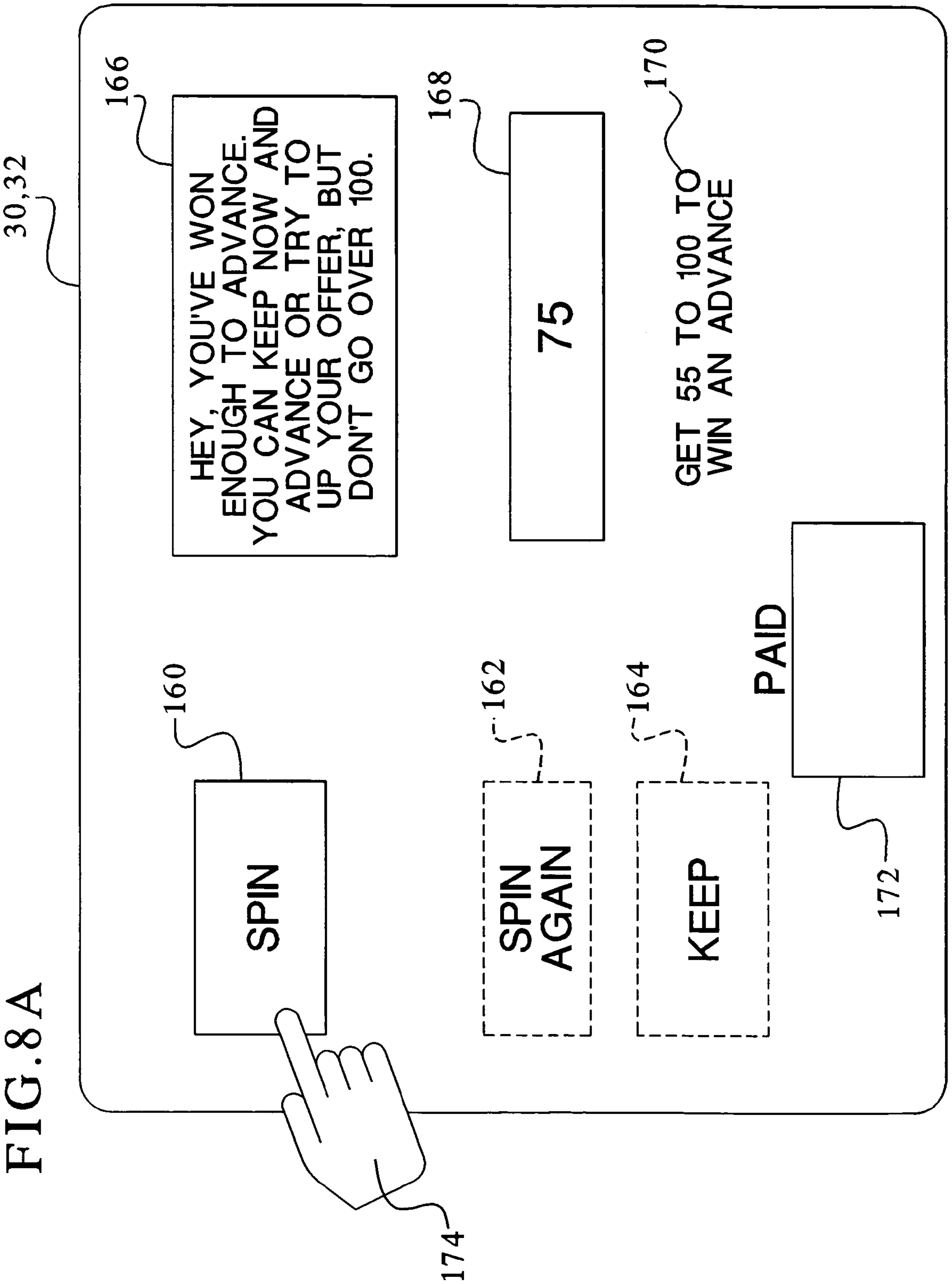
FIGS. 8A through 8C are front elevational views of one of the display devices of FIGS. 1A and 1B illustrating example outcomes of when an first offer does meet or exceed the advance threshold.
Figure 8B:
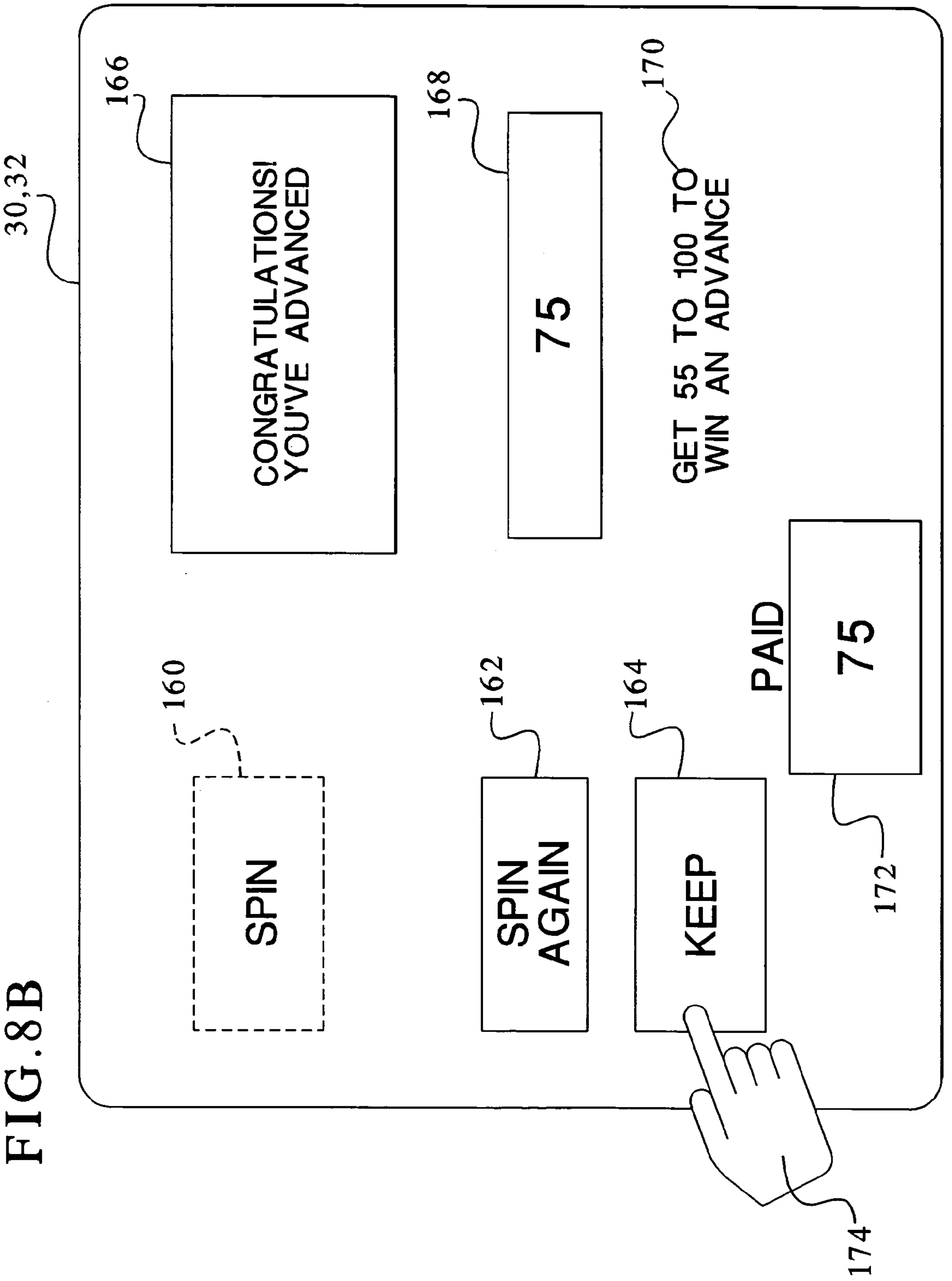
Figure 8C:
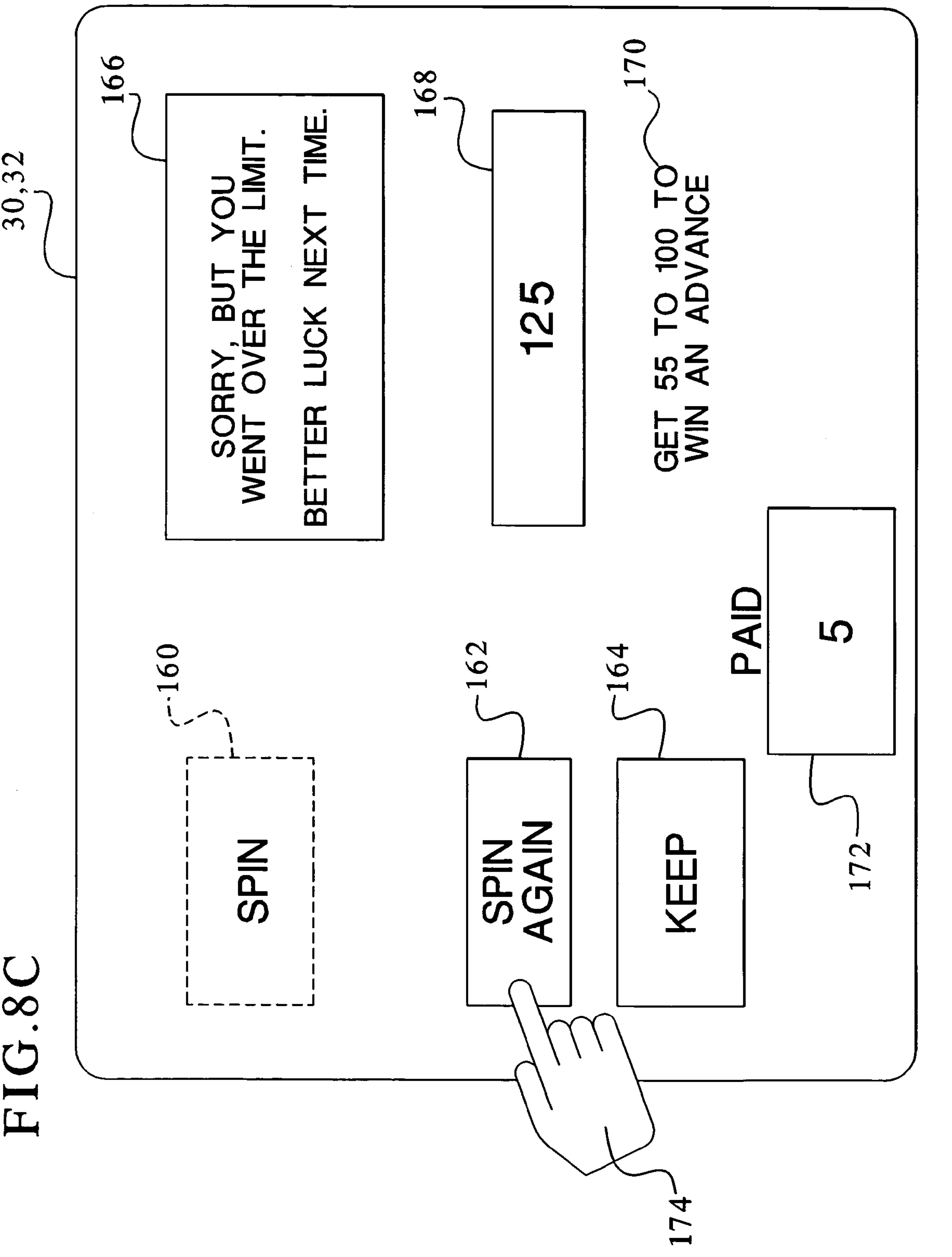

Referring now to FIGS. 8A through 8C, second example of the present invention is illustrated with different game possibilities that occur when the player inputs a spin or spin again and the game provides an offer that meets or exceeds the advance threshold. In FIG. 8A, the player firstly picks the spin input 160 and the game generates an offer of seventy-five for the player as indicated in the offer display 168. The message display 166 informs the player of the status after the first spin. In this example, the game informs the player that the player has achieved an first offer which exceeds the advance threshold and is within the advance range so that the offer is sufficient to win an advance. The message display 166 also informs the player that the player is able to keep or accept the current offer of seventy-five or risk the offer, including the enabled or issued advance, for a chance to increase the player's offer and obtain the limit award for reaching the limit. As illustrated by the paid display 172, the game has yet to pay any credits to the player. Thus, the player must choose between a guaranteed advance or risking the advance for an opportunity to win a higher offer and possibly the limit award.

FIG. 8B illustrates one example post-first spin outcome, wherein the player has already won an advance. The game enables the accept/reject feature via the spin again input 162 and the keep input 164. As illustrated, the player 174 does not risk the previously generated seventy-five offer or the advance and picks the accept offer or keep input 164, whereby the game does not modify the player's offer, as indicated by the offer display 168. The game pays the accepted offer of seventy-five to the player, as indicated by the paid display 172. The message display 166 informs the player of the player's game status after the second spin. In this instance, the game informs the player that the player has achieved a sufficient offer to win an advance.

FIG. 8C illustrates second example spin outcome, wherein the player has already won an advance. After the first spin, the game enables the accept/reject feature of the present invention via the spin again input 162 and the keep input 164. As illustrated, the player 174 risks the previously generated seventy-five offer and picks the reject offer or spin again input 162. The game increases the player's offer to one hundred twenty-five, as indicated by the offer display 168.

Since the limit in this example is one hundred and the game has generated an offer greater than the limit, the player loses the previous offer and the advance. In one embodiment, the game provides a consolation award of five credits to the player as indicated by the paid display 172. The message display 166 informs the player of status after the second spin. In this example, the game informs the player that the player has achieved an offer that has surpassed the limit.

It should be appreciated that when the player wins an advance: (i) on the first spin; or (ii) upon a subsequent spin, the game includes providing any of the outcomes illustrated in FIGS. 7A through 7H. That is, besides accepting or keeping the offer (FIG. 8A) and rejecting the offer and exceeding the limit (FIG. 8B), the game includes providing an increased offer (as described in FIGS. 7B and 7C) and may trigger the limit award sequence and thereafter generating any of its outcomes (as illustrated in FIGS. 7F through 7H). It should also be appreciated that in an embodiment having the auto-accept feature of the present invention, after winning or achieving an advance, the game automatically accepts the offer and does not enable the player to risk the advance by rejecting the offer.

As discussed in connection with the block 126 of FIG. 4, an advance includes a plurality of different outcomes. When the player wins an advance, the player may simply win an additional value. When the player wins an advance, the game may provide second bonus game sequence in which the player is guaranteed to win an additional award. When the player wins an advance, the game may provide second game sequence in which the player can win an additional award. To generate these outcomes, the game performs second sequence or portion of an existing game or runs a new game sequence.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device operable under control of a processor, said gaming device comprising:

a game controlled by the processor;

an advance threshold in said game;

a plurality of offers in said game, wherein at least one of said offers exceeds said advance threshold;

an advance in said game;

an offer acceptor in communication with the processor;

an offer rejecter in communication with the processor; and a display device controlled by the processor and adapted to display said game;

wherein said processor is operable with said display device to control a play of said game by:

(a) generating a first one of said plurality of offers;

(b) enabling a player to accept or reject said first offer;

(c) if the player accepts the first offer:

(i) providing said first offer to the player, and (ii) providing said advance to the player if the provided first offer exceeds said advance threshold; and (d) if the player rejects said first offer:

(i) generating a second offer, and (ii) providing said advance to the player if the second offer exceeds said advance threshold.

2. The gaming device of claim 1, wherein said processor is operable to control the play of said game by displaying said advance threshold to the player.

3. The gaming device of claim 1, wherein the second offer is one of said plurality of offers.

4. The gaming device of claim 1, wherein the second offer is a combination of the first offer and one of said plurality of offers.

5. The gaming device of claim 1, wherein said second offer is provided to the player.

6. A gaming device operable under control of a processor, said gaming device comprising:

a game controlled by the processor;

an advance threshold in said game;

a limit in said game;

a range in said game, said range at least partially defined by said advance threshold and said limit;

a plurality of offers in said game, wherein at least one of said offers exceeds said advance threshold;

an offer acceptor/rejecter in communication with the processor;

an advance in said game; and a display device controlled by the processor and adapted to display said game;

wherein said processor is operable with said display device to control a play of said game by:

(a) generating a first one of said plurality of offers;

(b) enabling the player to accept or reject said first offer;

(c) if the player accepts the first offer:

(i) providing said first offer to the player, and (ii) providing said advance to the player if the provided first offer is in said range; and (d) if the player rejects said first offer:

(i) generating a second offer, and (ii) providing said advance to the player if the second offer is in said range.

7. The gaming device of claim 6, wherein said processor is operable to control the play of said game by displaying said advance threshold to the player.

8. The gaming device of claim 6, wherein said processor is operable to control the play of said game by displaying said limit to the player.

9. The gaming device of claim 6, wherein the second offer is one of said plurality of offers.

10. The gaming device of claim 6, wherein the second offer is a combination of the first offer and one of said plurality of offers.

11. The gaming device of claim 6, wherein said second offer is provided to the player.

12. The gaming device of claim 6, wherein said processor is operable to control the play of said game by providing an award to the player if the first offer equals said limit.

13. A gaming device operated under control of a processor, said gaming device comprising:

a game controlled by the processor;

a first advance threshold in said game;

a second advance threshold in said game;

a plurality of offers in said game, wherein at least one of said offers exceeds the first advance threshold and at least one of said offers exceeds said second advance threshold;

an offer acceptor/rejecter in communication with the processor;

an advance in said game; and a display device controlled by the processor and adapted to display said game;

wherein said processor is operable with said display device to control a play of said game by:

(a) generating a first one of said plurality of offers;

(b) enabling a player to accept or reject said first offer;

(c) if the player accepts the first offer:

(i) providing said first offer to the player, and (ii) providing said advance to the player if the provided first offer exceeds said first advance threshold; and (d) if the player rejects said first offer:

(i) generating a second offer, and (ii) providing said advance to the player if the second offer exceeds said second advance threshold.

14. The gaming device of claim 13, which includes a limit.

15. The gaming device of claim 14, wherein the processor is operable to control the play of said game by providing said advance to the player if the player accepts the first offer, the first offer exceeds said first advance threshold and said first offer does not exceed said limit.

16. The gaming device of claim 14, wherein the processor is operable to control the play of said game by providing said advance to the player if the second offer exceeds said second advance threshold and said second offer does not exceed said limit.

17. The gaming device of claim 13, wherein said processor is operable to control the play of said game by causing the display device to display said advance thresholds to the player.

18. The gaming device of claim 13, wherein the second offer is one of said plurality of offers.

19. The gaming device of claim 13, wherein the second offer is a combination of the first offer and one of said plurality of offers.

20. The gaming device of claim 13, wherein said second offer is provided to the player.

21. The gaming device of claim 13, wherein said first advance threshold and said second advance threshold are different.

22. A gaming device operated under control of a processor, said gaming device comprising:

a game controlled by the processor;

an advance threshold in said game;

a first limit in said game;

a first range in said game, said first range at least partially defined by said advance threshold and said first limit;

a second limit in said game, a second range in said game, said second range at least partially defined by said advance threshold and said second limit;

an advance in said game;

a plurality of offers in said game, wherein at least one of said offers is in said first range and at least one of said offers is in said second range;

an offer acceptor/rejecter in communication with the processor; and a display device controlled by the processor and adapted to display said game;

wherein said processor is operable with said display device to control a play of said game by:

(a) generating a first one of said plurality of offers;

(b) enabling a player to accept or reject said first offer;

(c) if the player accepts the first offer:

(i) providing said first offer to the player, and (ii) providing said advance to the player if the provided first offer is in said first range; and (d) if the player rejects said first offer:

(i) generating a second offer, and (ii) providing said advance to the player if the second offer is in said second range.

23. The gaming device of claim 22, wherein said processor is operable to control the play of said game by displaying said advance threshold to the player.

24. The gaming device of claim 22, wherein said processor is operable to control the play of said game by displaying said limits to the player.

25. The gaming device of claim 22, wherein the second offer is one of said plurality of offers.

26. The gaming device of claim 22, wherein the second offer is a combination of the first offer and one of said plurality of offers.

27. The gaming device of claim 22, wherein said second offer is provided to the player.

28. The gaming device of claim 22, wherein said processor is operable to control the play of said game by providing an award to the player if the first offer equals said first limit.

29. The gaming device of claim 22, wherein said processor is operable to control the play of said game by providing an award to the player if the second offer equals said second limit.

30. A gaming device operable under control of a processor, said gaming device comprising:

a game controlled by the processor;

an advance threshold in said game;

a limit in said game;

a plurality of offers in said game, wherein at least one of said offers exceeds said advance threshold;

an advance in said game;

an offer acceptor/rejecter in communication with the processor; and a display device controlled by the processor and adapted to display said game;

wherein said processor is operable with said display device to control a play of said game by:

(a) generating an initial one of said plurality of offers;

(b) enabling the player to accept or reject said offer;

(c) if the player accepts said offer:

(i) providing said offer to the player, and (ii) providing said advance to the player if the provided offer exceeds said advance threshold and said provided offer does not exceed said limit; and (d) if the player rejects said offer:

(i) generating a subsequent offer, and (ii) repeating steps (b) to (d) until said subsequent offer exceeds said limit.

31. The gaming device of claim 30, wherein said processor is operable to control the play of said game by displaying said advance threshold to the player.

32. The gaming device of claim 30, wherein said processor is operable to control the play of said game by displaying said limit to the player.

33. The gaming device of claim 30, wherein said processor is operable to control the play of said game by repeating (b) to (d) until the player has rejected a number of offers.

34. The gaming device of claim 30, wherein said processor is operable to control the play of said game by providing an award to the player if any of said offers equal said limit.

35. A gaming device operable under control of a processor, said gaming device comprising:

a game controlled by the processor;

an advance threshold in said game;

a plurality of offers in said game, wherein a combination of at least two of said offers exceeds said advance threshold;

an advance in said game; and a display device controlled by the processor and adapted to display said game;

wherein said processor is operable with said display device to control a play of said game by:

(a) generating a first one of said plurality of offers;

(b) enabling a player to accept or reject said first offer;

(c) if the player accepts the first offer providing said first offer to the player; and (d) if the player rejects said first offer:

(i) generating a second offer, wherein said second offer is a combination of the first offer and one of said plurality of offers, and (ii) providing said advance to the player if the second offer exceeds said advance threshold.

36. The gaming device of claim 35, which includes a limit.

37. The gaming device of claim 36, wherein the processor is operable to control the player of said game by providing said advance to the player if the second offer exceeds said advance threshold and said second offer does not exceed said limit.

38. A method of operating a gaming device, said method comprising:

(a) displaying an advance threshold to a player;

(b) generating a first offer, wherein said first offer is one of a plurality of offers and at least one of said plurality of offers exceeds said advance threshold;

(c) enabling the player to accept or reject said first offer;

(d) if the player accepts said first offer, providing said first offer to the player;

(e) if the player accepts said first offer and said first offer exceeds said advance threshold, providing an advance to the player;

(f) if the player rejects said first offer, generating a second offer; and (g) providing said advance to the player if said second offer exceeds said advance threshold.

39. The method of claim 38, wherein the second offer is one of said plurality of offers.

40. The method of claim 38, wherein the second offer is a combination of the first offer and one of said plurality of offers.

41. The method of claim 38, which includes displaying a limit to the player, whereby said advance is provided to the player if said first generated offer exceeds said advance threshold and does not exceed said limit.

42. The method of claim 41, whereby said advance is provided to the player if said second offer exceeds said advance threshold and does not exceed said limit.

43. The method of claim 38, which is provided to the player through a data network.

44. The method of claim 43, wherein the data network is an internet.

45. A method of operating a gaming device, said method comprising:

(a) displaying an advance threshold and a limit to a player, wherein said advance threshold and said limit at least partially define a range;

(b) generating a first offer, said first offer being one of a plurality of offers, wherein at least one of said plurality of offers is in said range;

(c) enabling the player to accept or reject said first offer;

(d) if the player accepts said first offer:

(i) providing said first offer to the player, and (ii) if said first offer is in said range, providing an advance to the player;

(e) if the player rejects said first offer, generating a second offer; and (f) if said second offer is in said range, providing said advance to the player.

46. The method of claim 45, which includes providing an award to the player if the first offer equals said limit.

47. The method of claim 45, wherein said second offer is a combination of the first offer and one of said plurality of offers.

48. The method of claim 45, which includes providing an award to the player if said second offer equals said limit.

49. The method of claim 45, which is provided to the player through a data network.

50. The method of claim 49, wherein the data network is an internet.

51. A method of operating a gaming device, said method comprising:

(a) displaying a limit to a player;

(b) generating a first offer, wherein said first offer is one of a plurality of offers;

(c) enabling the player to accept or reject said first offer;

(d) if said first offer is accepted, providing said first offer to the player;

(e) if said first offer is rejected, generating a second offer;

(f) providing a limit award to the player if said first offer or said second offer equals said limit; and (g) providing a consolation award to the player if said second offer exceeds said limit.

52. The method of claim 51, which includes displaying an advance threshold to the player and providing an advance to the player if the player accepts said first offer and said first offer is in a range at least partially defined by said advance threshold and said limit.

53. The method of claim 52, which includes providing said advance to the player if the first offer is rejected and said second offer is in said range.

54. The method of claim 51, which is provided to the player through a data network.

55. The method of claim 54, wherein the data network is an internet.

56. A method of operating a gaming device, said method comprising:

(a) providing a first game which includes an advance threshold;

(b) enabling a player to risk an offer made to the player to achieve said advance threshold; and (c) providing a second game if the advance threshold is achieved by the player in the first game.

57. The method of claim 56, wherein the first game includes a limit and a range at least partially defined by said advance threshold and said limit, whereby the player must obtain an offer within the range to play the second game.

58. The method of claim 56, which is provided to the player through a data network.

59. The method of claim 58, wherein the data network is an Internet.

60. A method of operating a gaming device, said method comprising:

(a) generating a first one of a plurality of offers, wherein at least one of said offers exceeds a first advance threshold and at least one of said offers exceeds a second advance threshold;

(b) enabling a player to accept or reject said first offer;

(c) if the player accepts the first offer:

(i) providing said first offer to the player, and (ii) providing an advance to the player if the provided first offer exceeds said first advance threshold; and (d) if the player rejects said first offer:

(i) generating a second offer, and (ii) providing said advance to the player if the second offer exceeds said second advance threshold.

61. The method of claim 60, which includes a limit.

62. The method of claim 61, which includes providing said advance to the player if the player accepts the first offer, the first offer exceeds said first advance threshold and said first offer does not exceed said limit.

63. The method of claim 61, which includes providing said advance to the player if the second offer exceeds said second advance threshold and said second offer does not exceed said limit.

64. The method of claim 60, which includes displaying said advance thresholds to the player.

65. The method of claim 60, wherein the second offer is one of said plurality of offers.

66. The method of claim 60, wherein the second offer is a combination of the first offer and one of said plurality of offers.

67. The method of claim 60, which includes providing said second offer to the player.

68. The method of claim 60, wherein said first advance threshold and said second advance threshold are different.

69. The method of claim 60, which is provided to the player through a data network.

70. The method of claim 69, wherein the data network is an internet.

71. A method of operating a gaming device, said method comprising:

(a) generating a first one of a plurality of offers, wherein at least one of said offers is in a first range at least partially defined by an advance threshold and a first limit and at least one of said offers is in a second range at least partially defined by said advance threshold and a second limit;

(b) enabling a player to accept or reject said first offer;

(c) if the player accepts the first offer:

(i) providing said first offer to the player, and (ii) providing an advance to the player if the provided first offer is in said first range; and (d) if the player rejects said first offer:

(i) generating a second offer, and (ii) providing said advance to the players if the second offer is in said second range.

72. The method of claim 71, which includes displaying said advance threshold to the player.

73. The method of claim 71, which includes displaying said limits to the player.

74. The method of claim 71, wherein the second offer is one or said plurality of offers.

75. The method of claim 71, wherein the second offer is a combination of the first offer and one of said plurality of offers.

76. The method of claim 71, wherein said second offer is provided to the player.

77. The method of claim 71, which includes providing an award to the player if the first offer equals said first limit.

78. The method of claim 71, which includes providing an award to the player if the second offer equals said second limit.

79. The method of claim 71, which is provided to the player through a data network.

80. The method of claim 79, wherein the data network is an internet.

81. A method of operating a gaming device, said method comprising:

(a) generating an initial one of a plurality of offers wherein at least one of said offers exceeds an advance threshold;

(b) enabling the player to accept or reject said offer;

(c) if the player accepts said offer:

(i) providing said offer to the player, and (ii) providing an advance to the player; if the provided offer exceeds said advance threshold and said provided offer does not exceed a limit; and (d) if the player rejects said offer:

(i) generating a subsequent offer, and (ii) repeating steps (b) to (d) until said subsequent offer exceeds said limit.

82. The method of claim 81, which includes displaying said advance threshold to the player.

83. The method of claim 81, which includes displaying said limit to the player.

84. The method of claim 81, which includes repeating steps (b) to (d) until the player has rejected a number of offers.

85. The method of claim 81, which includes providing an award to the player if any of said offers equal said limit.

86. The method of claim 81, which is provided to the player through a data network.

87. The method of claim 86, wherein the data network is an internet.

88. A method of operating a gaming device, said method comprising:

(a) generating a first one of a plurality of offers, wherein a combination of at least two of said offers exceeds an advance threshold;

(b) enabling a player to accept or reject said first offer;

(c) if the player accepts the first offer, providing said first offer to the player; and (d) if the player rejects said first offer:

(i) generating a second offer, wherein said second offer is a combination of the first offer and one of said plurality of offers, and (ii) providing an advance to the player if the second offer exceeds said advance threshold.

89. The method of claim 88, which includes a limit.

90. The method of claim 89, which includes providing said advance to the player if the second offer exceeds said advance threshold and said second offer does not exceed said limit.

91. The method of claim 88, which is provided to the player through a data network.

92. The method of claim 91, wherein the data network is an internet.

* * * * *

UNITED STATES PATENT AND TRADEMARK OFFICE

CERTIFICATE OF CORRECTION

PATENT NO. : 7,331,864 B2 | Page 1 of 1

APPLICATION NO. : 10/925561

DATED : February 19, 2008

INVENTOR(S) : Anthony J. Baerlocher

It is certified that error appears in the above-identified patent and that said Letters Patent is hereby corrected as shown below:

In Column 4, Line 12 change “an” to --a--.

In Column 4, Line 16 change “an” to --a--.

In Column 7, Line 11 change “an” to --a--.

In Column 8, Line 50 change “an” to --a--.

In Column 11, Line 27 change “an” to --a--.

In Column 16, Line 40 insert --,-- between “offer” and “providing”.

Signed and Sealed this

Twenty-second Day of July, 2008

JON W. DUDAS

*Director of the United States Patent and Trademark Office*